(12) United States Patent
Lee et al.

(10) Patent No.: US 11,343,805 B2
(45) Date of Patent: *May 24, 2022

(54) METHOD FOR TRANSMITTING UPLINK DATA IN WIRELESS COMMUNICATION SYSTEM AND DEVICE FOR SAME

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,936

(22) Filed: Oct. 4, 2019

(65) Prior Publication Data

US 2020/0037311 A1    Jan. 30, 2020

Related U.S. Application Data

(63) Continuation of application No. 15/735,141, filed as application No. PCT/KR2015/006671 on Jun. 30, 2015, now Pat. No. 10,440,695.

(51) Int. Cl.
*H04W 72/04*    (2009.01)
*H04W 76/10*    (2018.01)
(Continued)

(52) U.S. Cl.
CPC ....... *H04W 72/0413* (2013.01); *H04L 1/1812* (2013.01); *H04W 72/085* (2013.01);
(Continued)

(58) Field of Classification Search
CPC ............... H04W 72/042; H04W 72/10; H04W 72/0413; H04W 72/085; H04W 72/04;
(Continued)

(56) References Cited

U.S. PATENT DOCUMENTS 10,440,695 B2   10/2019  Lee et al.
2008/0227428 A1  9/2008  Rezaiifar et al.
(Continued)

FOREIGN PATENT DOCUMENTS

KR   10-1387495    4/2014
WO   2008074669    6/2008

OTHER PUBLICATIONS

PCT International Application No. PCT/KR2015/006671, International Search Report dated Mar. 28, 2016, 2 pages.
(Continued)

*Primary Examiner* — Candal Elpenord
(74) *Attorney, Agent, or Firm* — Lee, Hong, Degerman, Kang & Waimey PC

(57) ABSTRACT

The present description provides a method for transmitting uplink (UL) data in a wireless communication system. A method, which is carried out by means of a terminal, comprises the steps of: receiving, from a base station, control information related to transmission of low latency radio (LLR) service data; transmitting, on the basis of the received control information, the low latency radio service data to the base station through an urgent channel, wherein the control information comprises urgent channel information and/or urgent bearer information defined for transmission of the low latency radio service data.

12 Claims, 26 Drawing Sheets

(51) Int. Cl.
  *H04L 1/18* (2006.01)
  *H04W 72/08* (2009.01)
  *H04W 72/10* (2009.01)
  *H04W 88/02* (2009.01)
  *H04W 88/08* (2009.01)

(52) U.S. Cl.
  CPC ........... *H04W 72/10* (2013.01); *H04W 76/10* (2018.02); *H04W 88/02* (2013.01); *H04W 88/08* (2013.01)

(58) Field of Classification Search
  CPC ..... H04W 72/02; H04W 76/27; H04W 76/10; H04L 1/1812; H04B 1/713
  See application file for complete search history.

(56) References Cited

U.S. PATENT DOCUMENTS

| | | | |
|---|---|---|---|
| 2008/0279143 | A1 | 11/2008 | Lee et al. |
| 2010/0297979 | A1 | 11/2010 | Watfa et al. |
| 2012/0281566 | A1 | 11/2012 | Pelletier et al. |
| 2014/0064176 | A1 | 3/2014 | Anchan |
| 2014/0349712 | A1 | 11/2014 | Shukla |
| 2015/0009874 | A1 | 1/2015 | Edara et al. |
| 2015/0009930 | A1* | 1/2015 | Rapaport .............. H04L 1/1825 370/329 |
| 2015/0085803 | A1 | 3/2015 | Hu et al. |
| 2016/0227560 | A1* | 8/2016 | Webb ................ H04W 72/1242 |
| 2016/0234857 | A1* | 8/2016 | Chen .................... H04L 5/0044 |
| 2016/0374104 | A1 | 12/2016 | Watfa et al. |
| 2018/0152939 | A1 | 5/2018 | Lee et al. |
| 2018/0310326 | A1* | 10/2018 | Tanaka .................. H04W 92/10 |

OTHER PUBLICATIONS

3rd Generation Partnership Project; Technical Specification Group Core Network and Terminals; Non-Access-Stratum (NAS) protocol for Evolved Packet System (EPS); Stage 3 (Release 13), 3GPP TS 24.301 V13.1.0, Mar. 2015, 384 pages.

United States Patent and Trademark Office U.S. Appl. No. 15/735,141, Notice of Allowance dated May 22, 2019, 10 pages.

United States Patent and Trademark Office U.S. Appl. No. 15/735,141, Office Action dated Jan. 28, 2019, 20 pages.

* cited by examiner

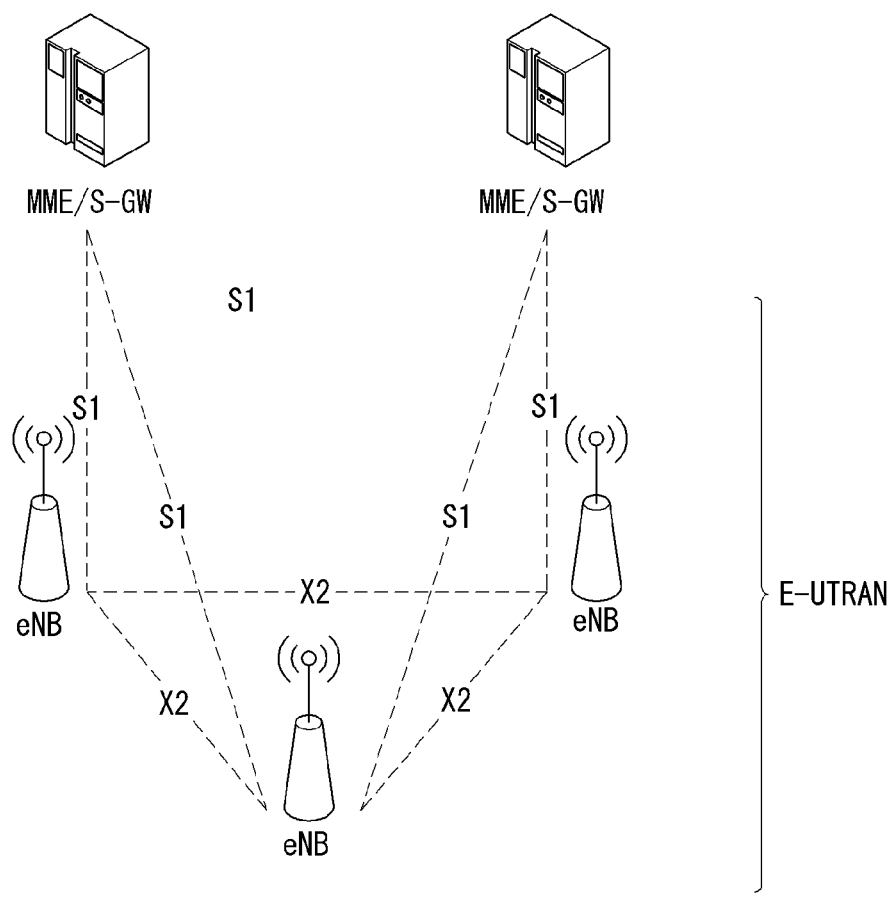
[FIG. 1]

[FIG. 2]
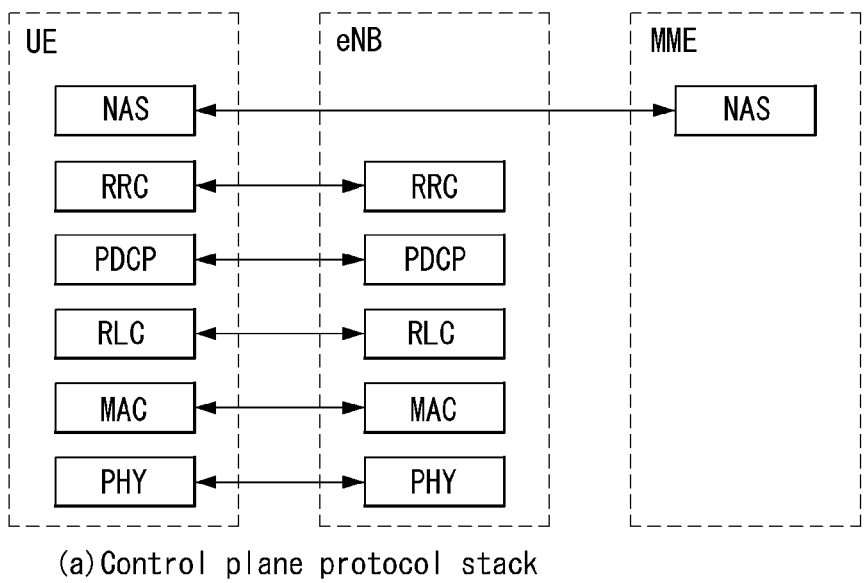
(a) Control plane protocol stack
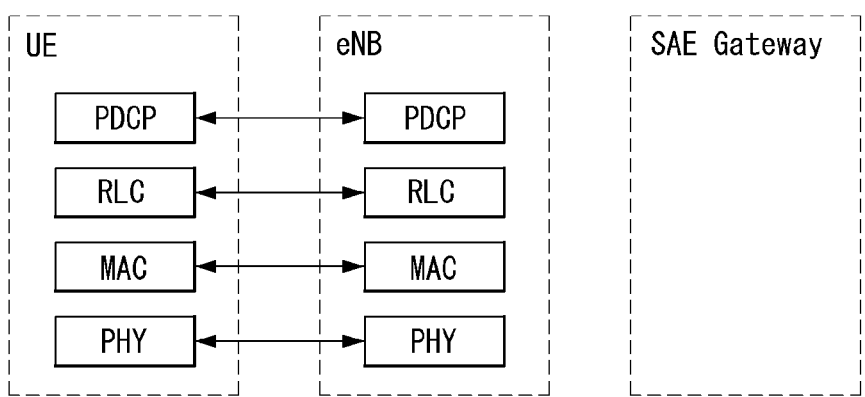
(b) Control plane protocol stack
[FIG. 3]
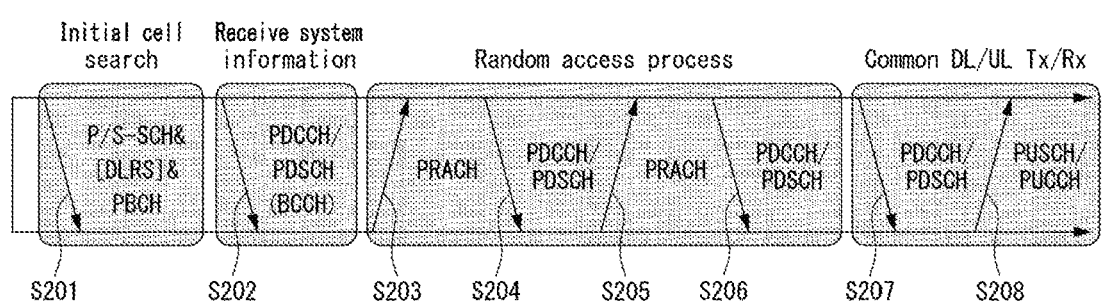

[FIG. 4]
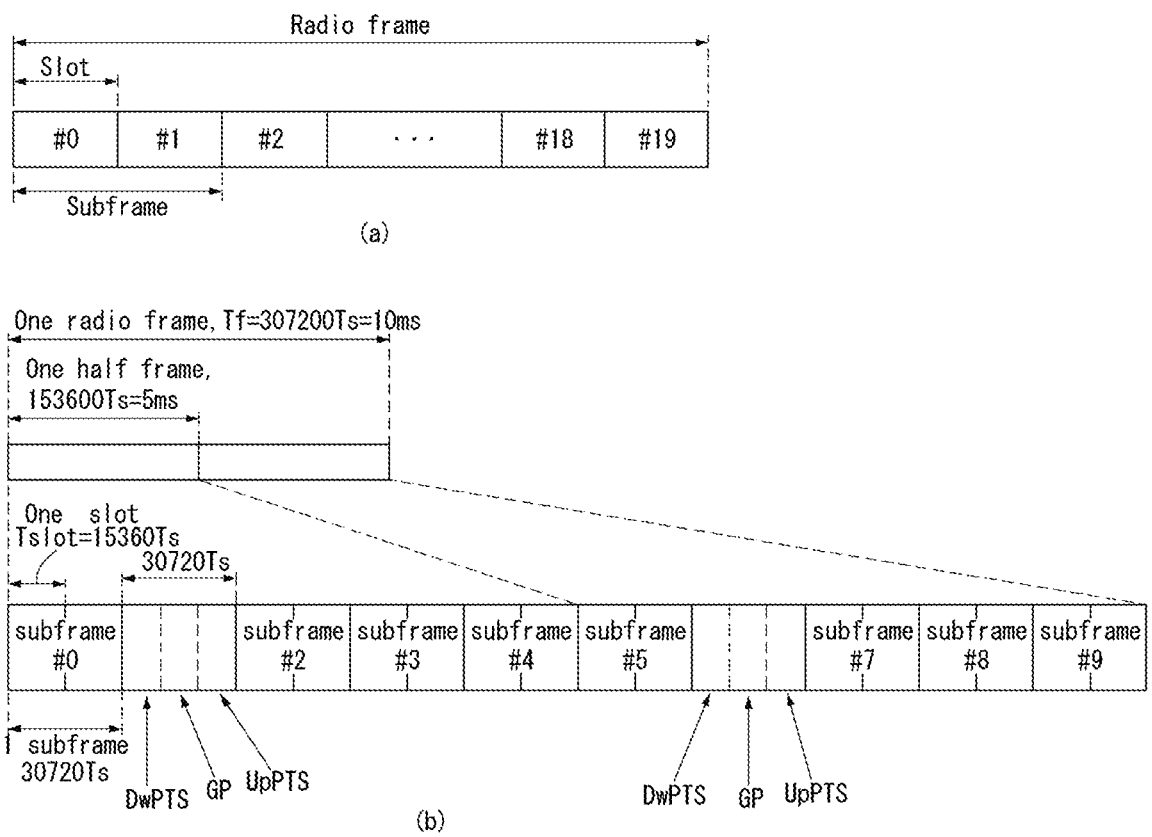

【FIG. 5】
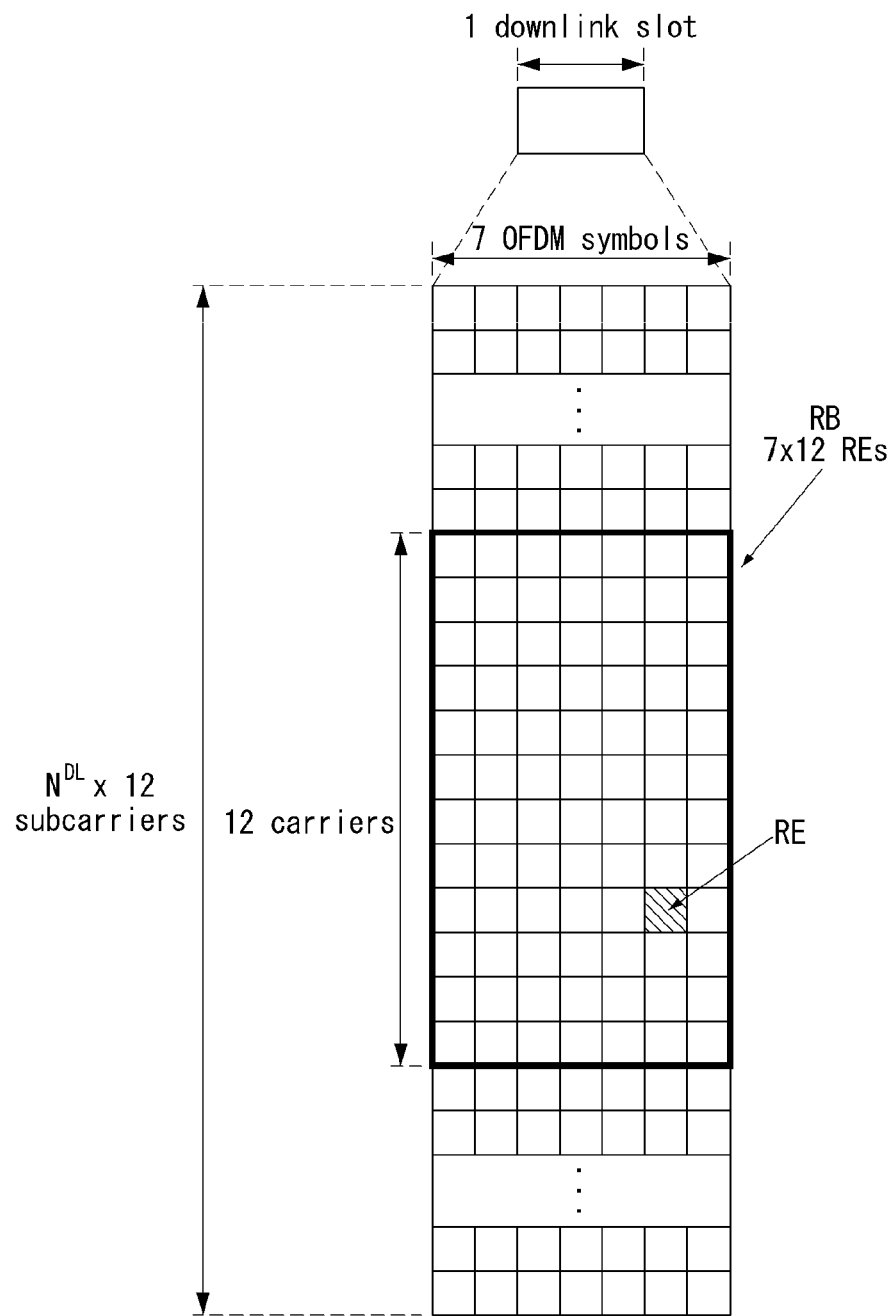

[FIG. 6]
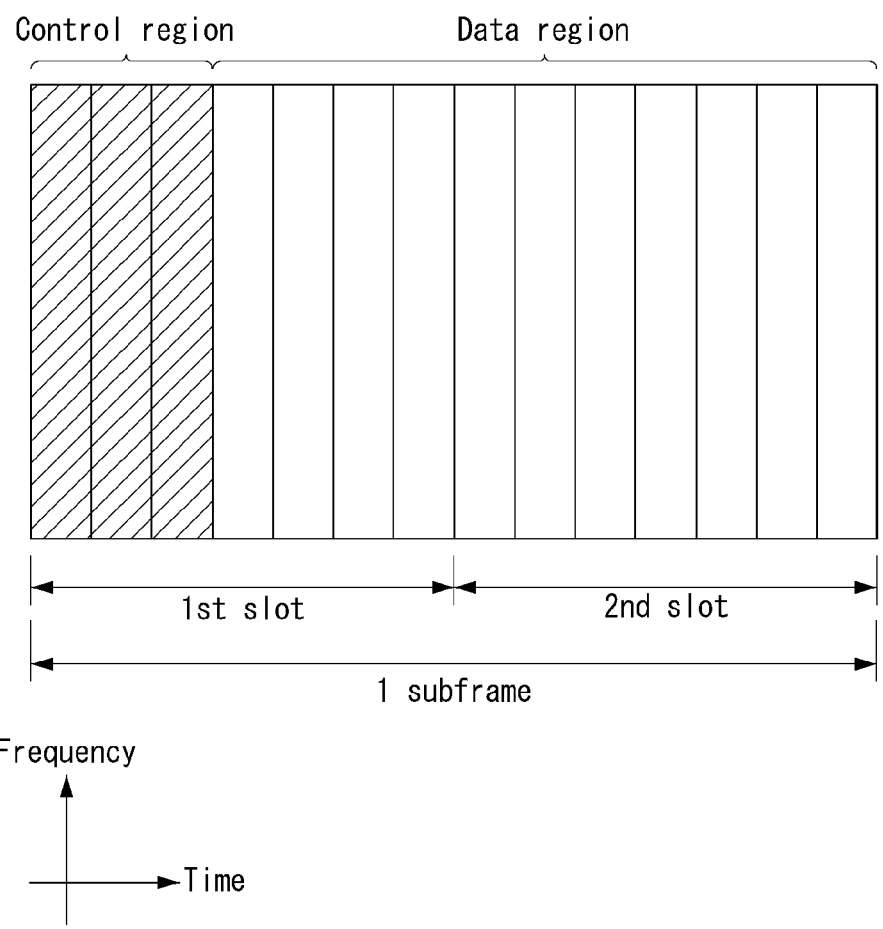

[FIG. 7]
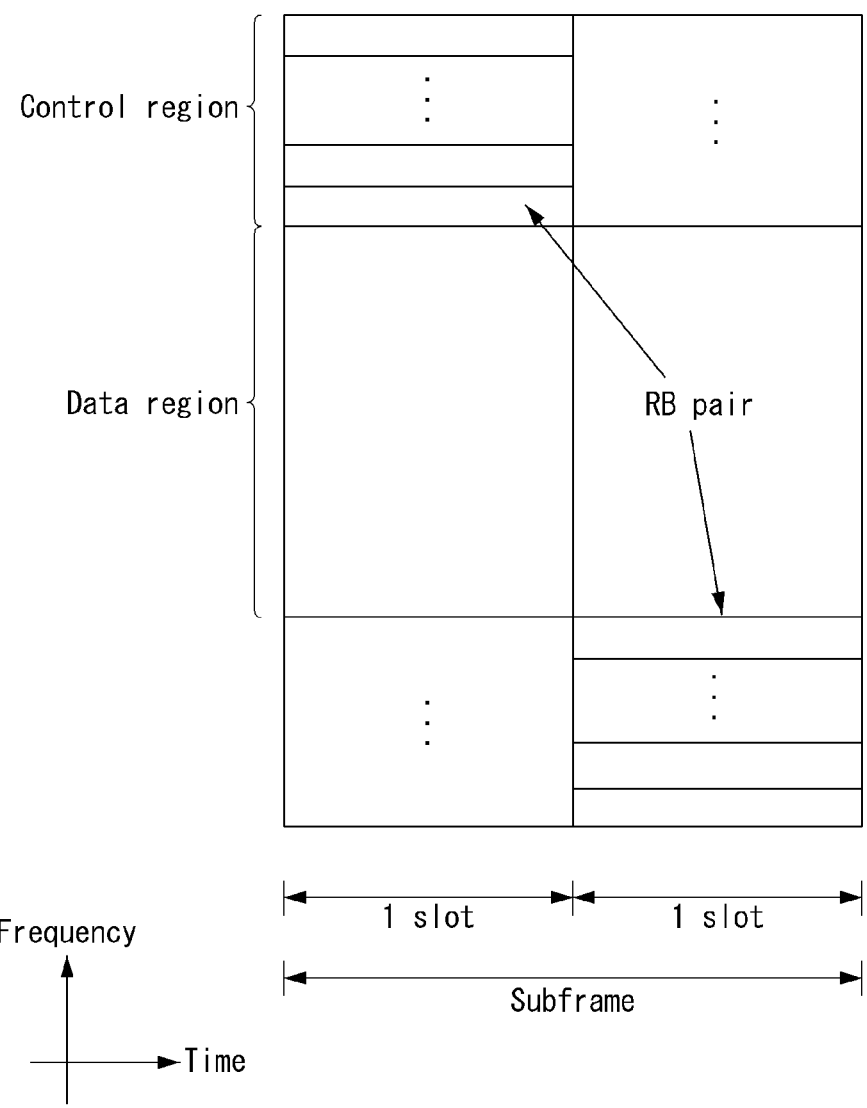

[FIG. 8]
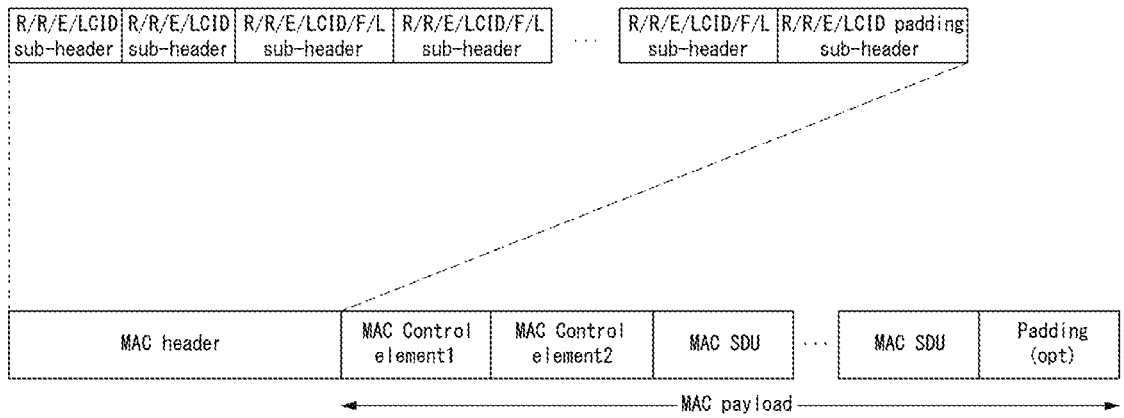
[FIG. 9]
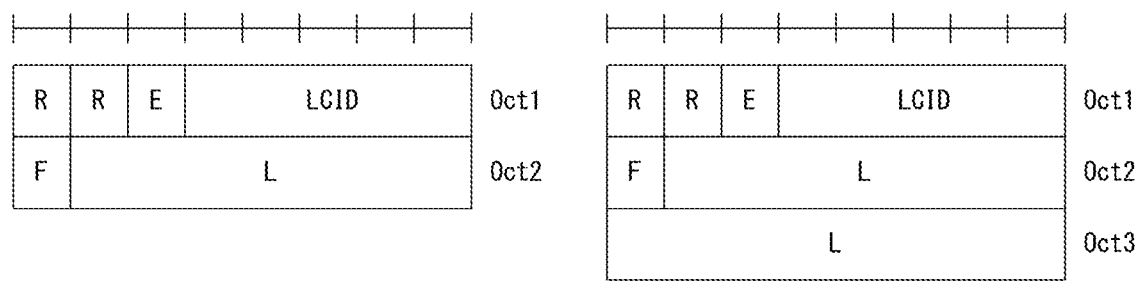
(a) R/R/E/LCID/F/L sub-header with 7-bit L field
(b) R/R/E/LCID/F/L sub-header with 15-bit L field
[FIG. 10]
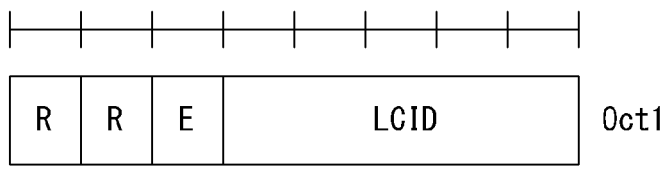
R/R/E/LCID sub-header

[FIG. 11]
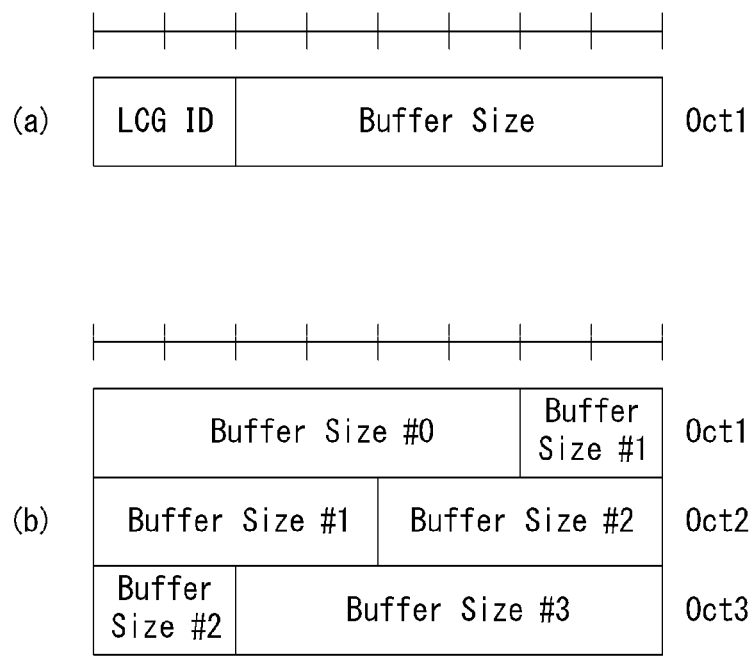

[FIG. 12]
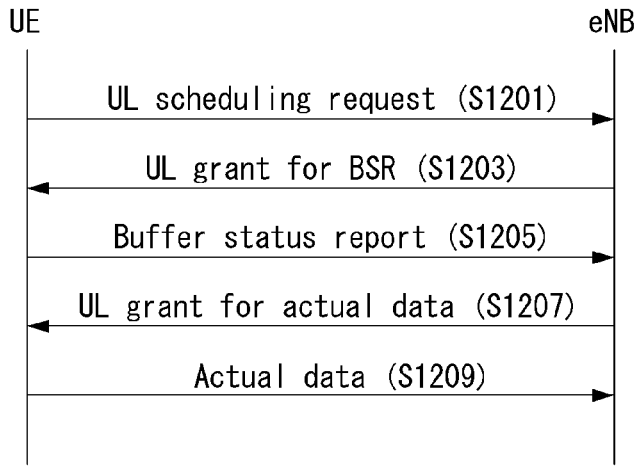
(a)
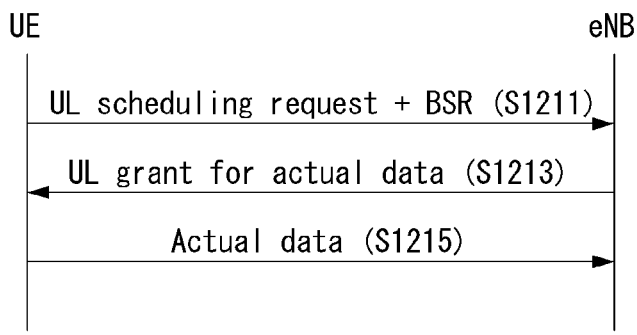
(b)
[FIG. 13]
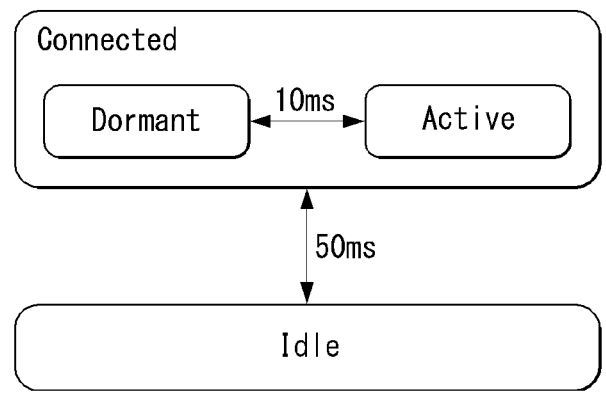

【FIG. 14】
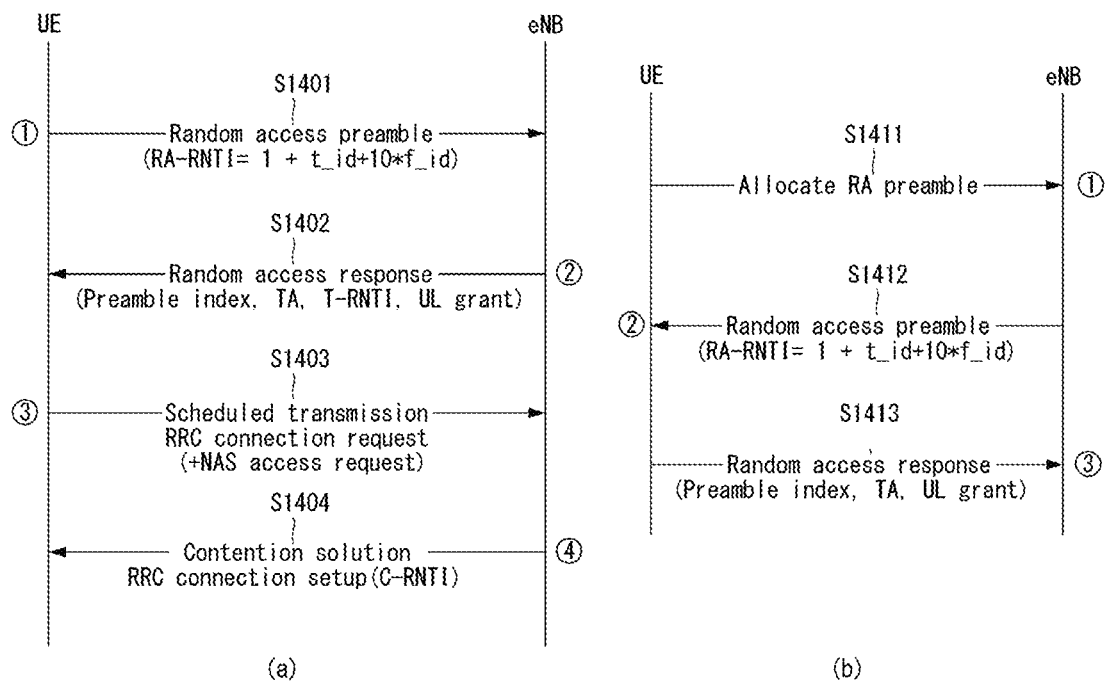

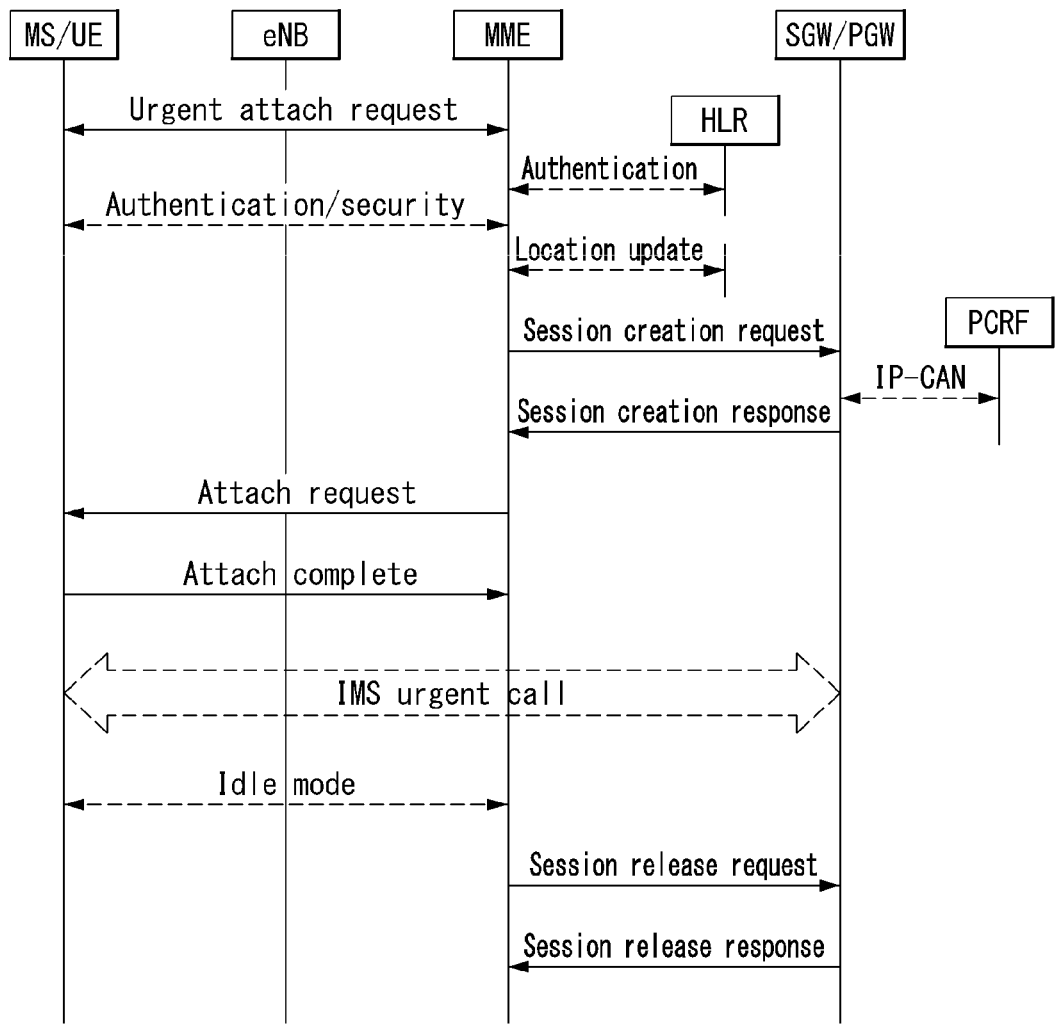
[FIG. 15]

[FIG. 16]
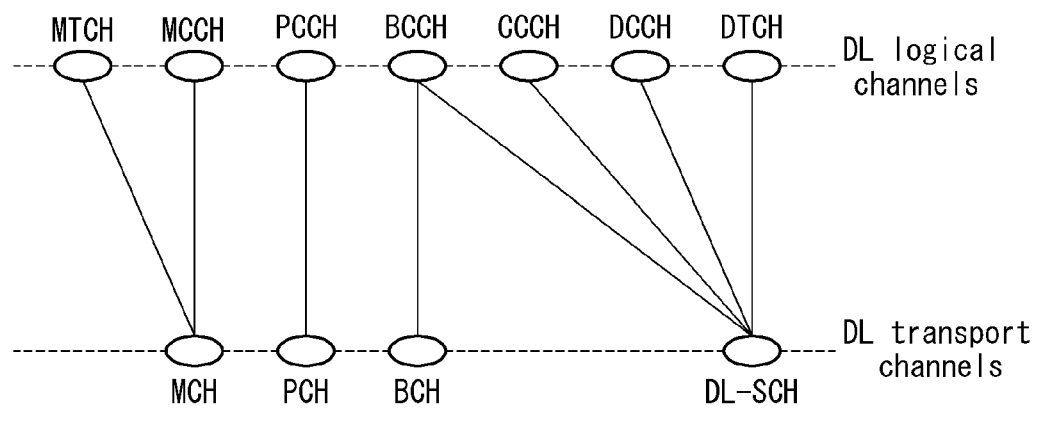
(a)
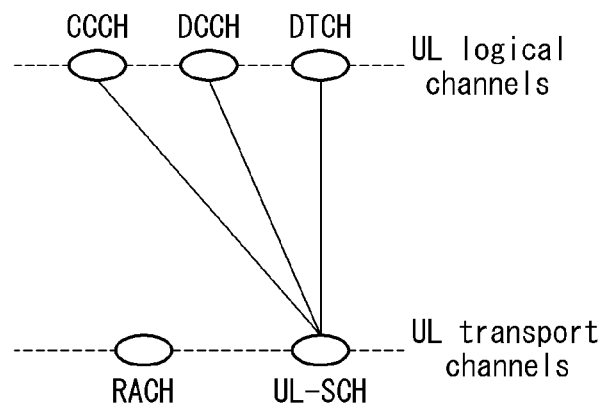
(b)

[FIG. 17]
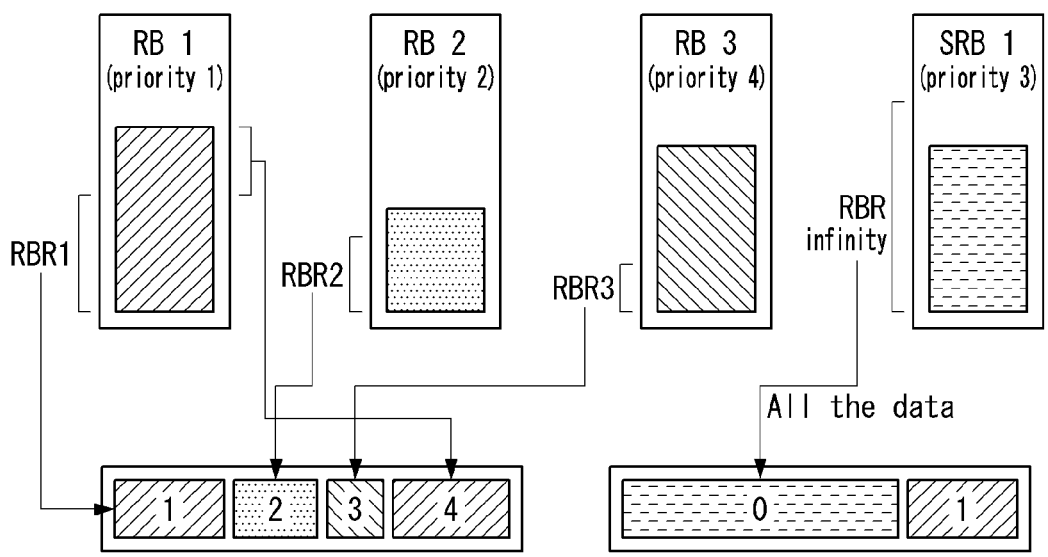
[FIG. 18]
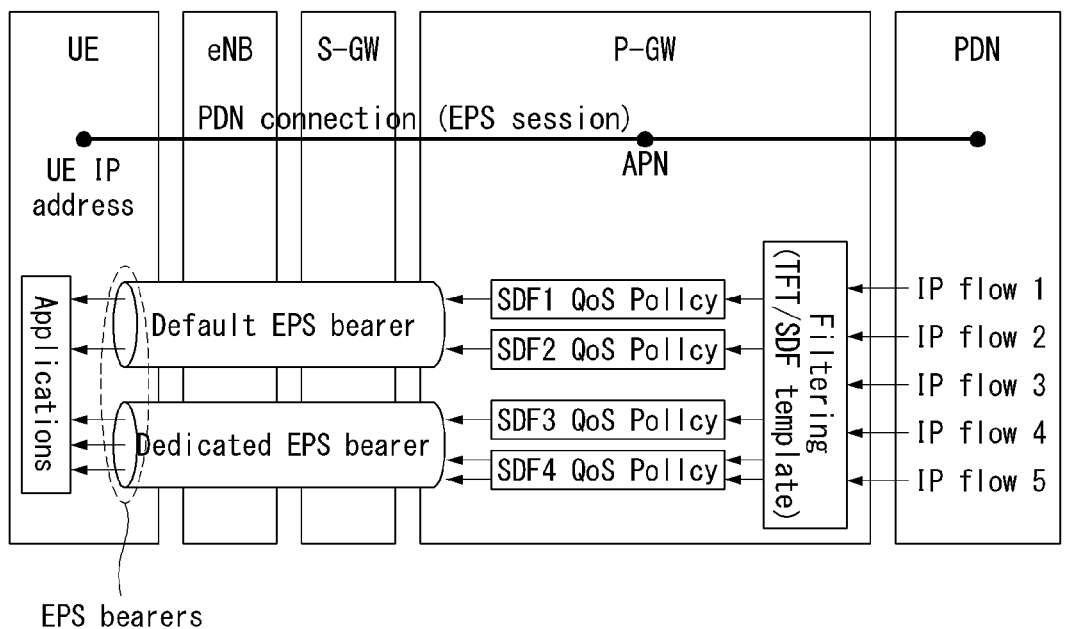

[FIG. 19]
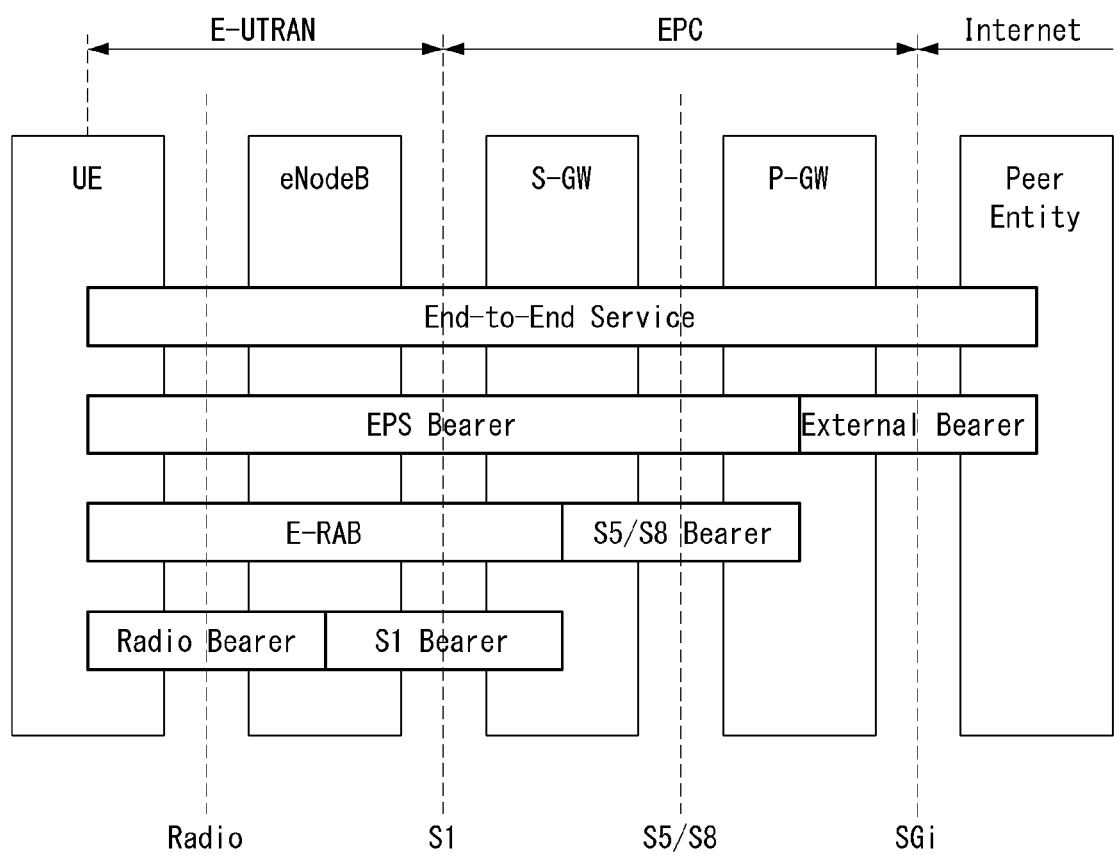

[FIG. 20]
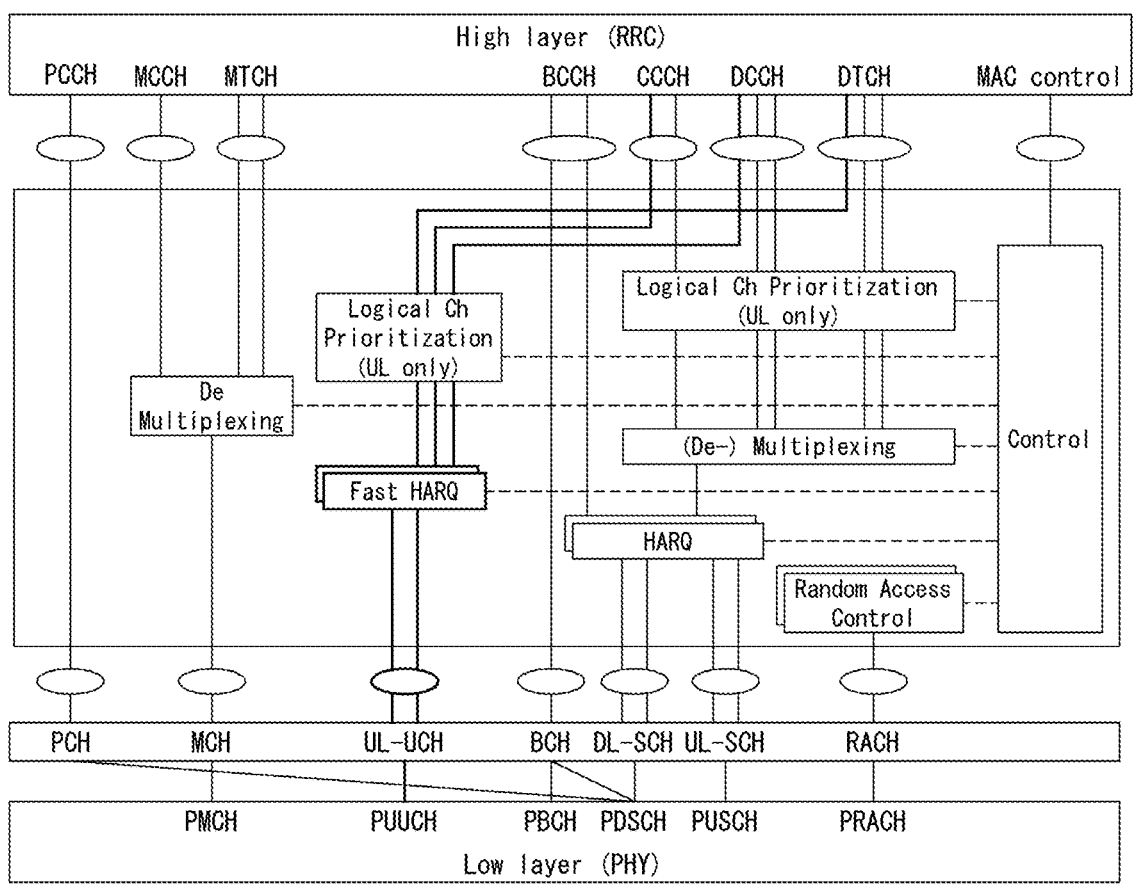

[FIG. 21]
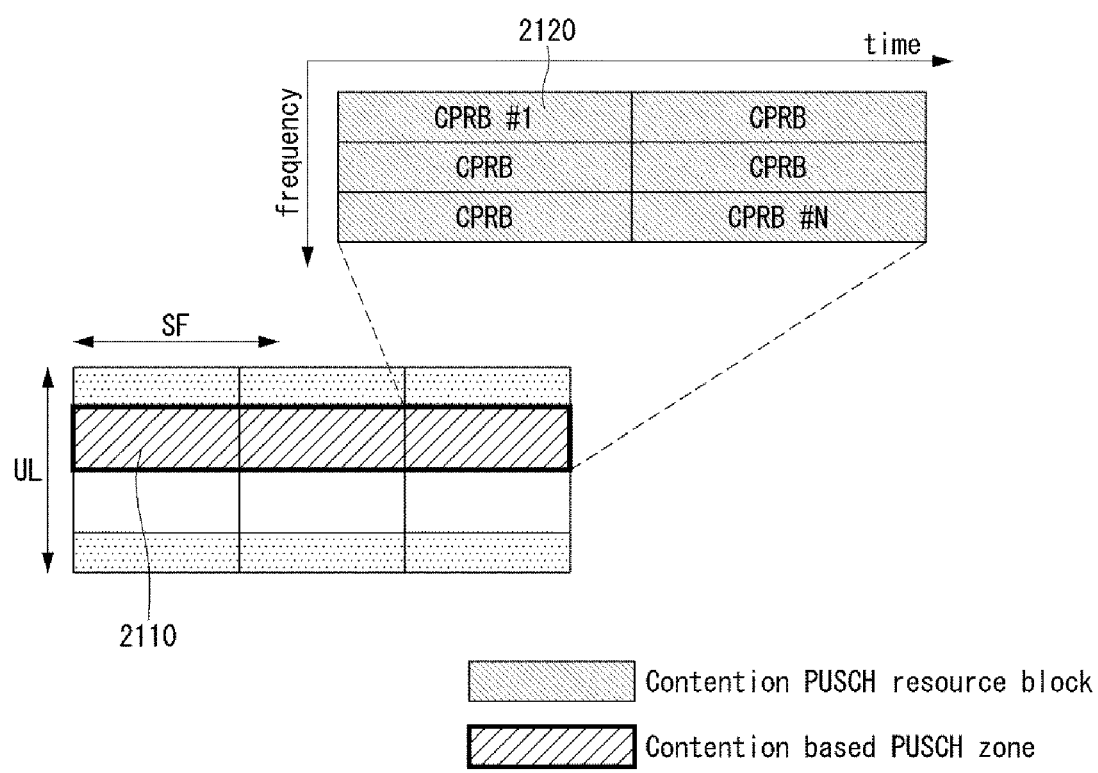

[FIG. 22]
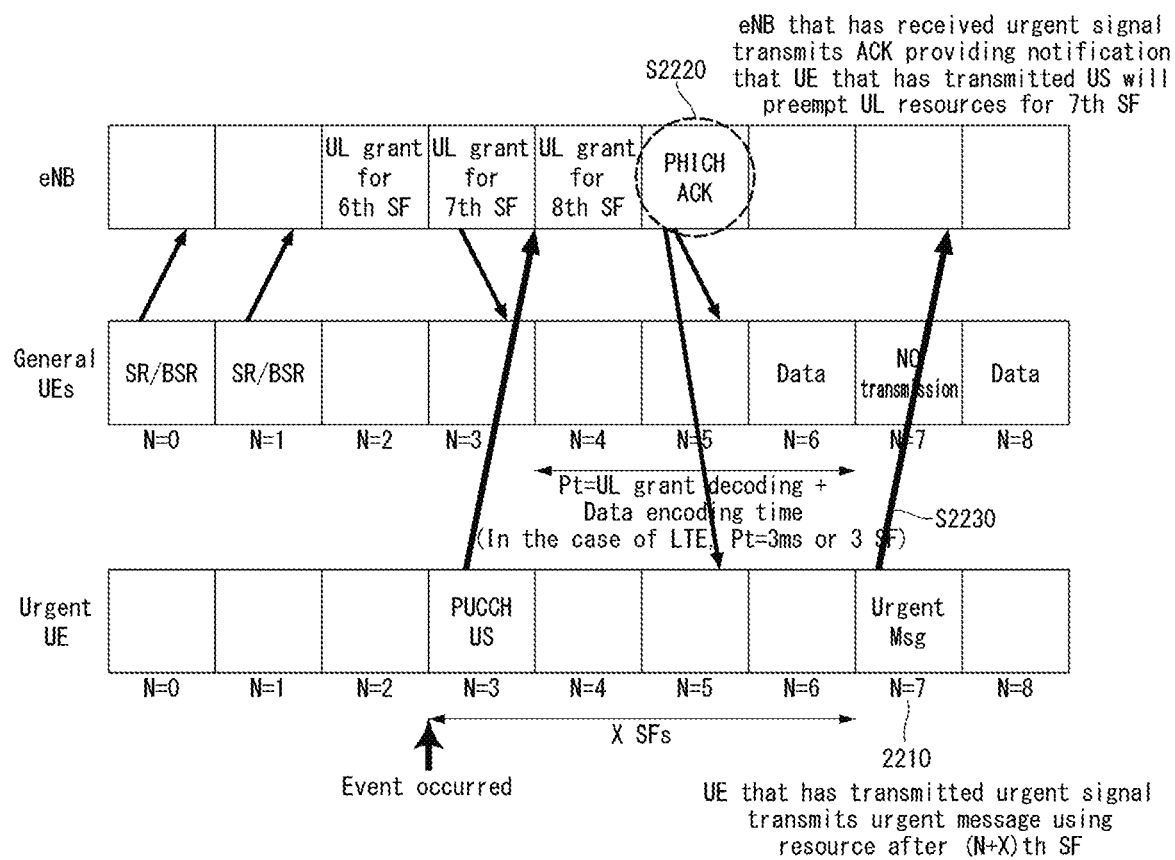

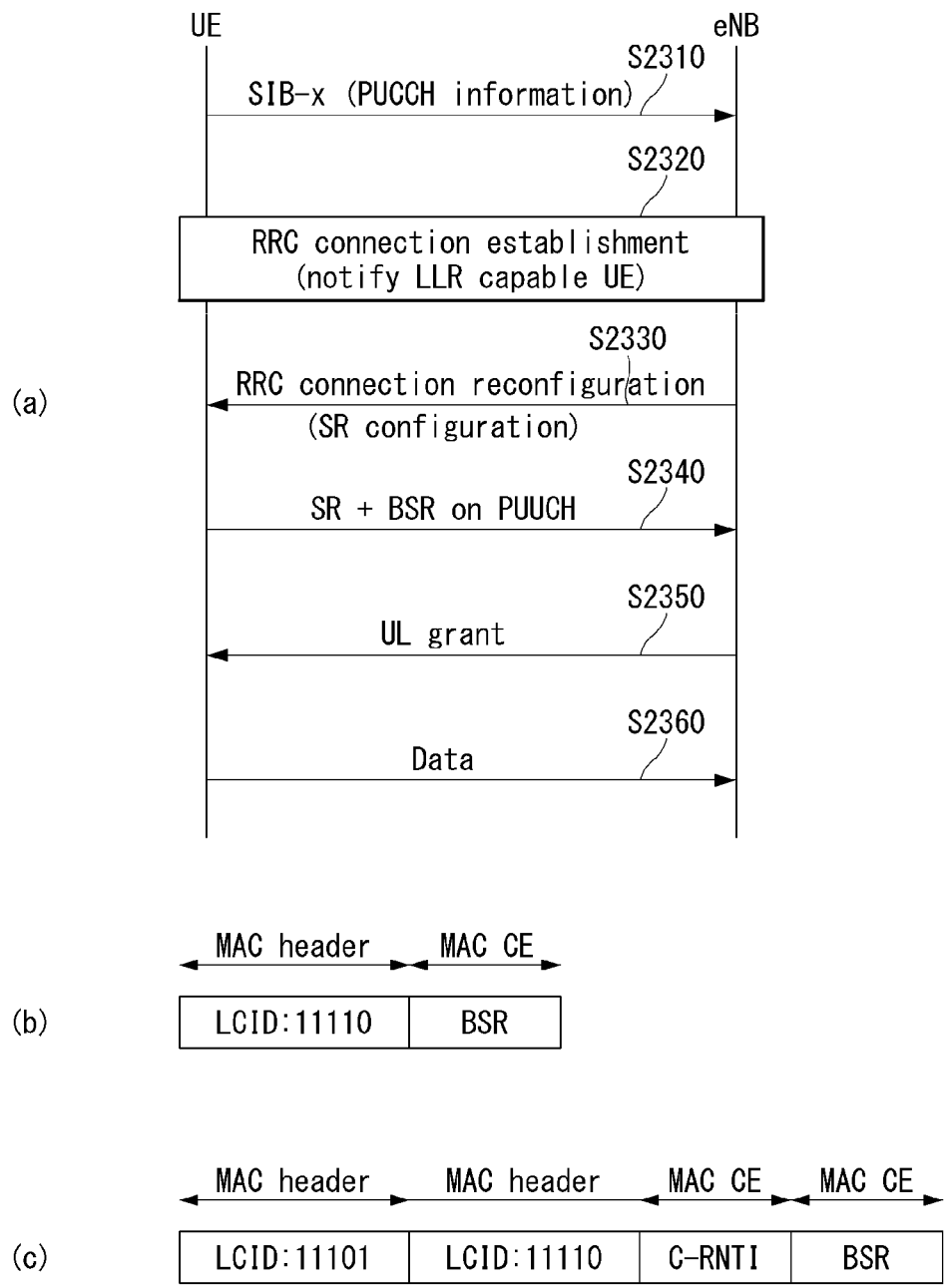
[FIG. 23]

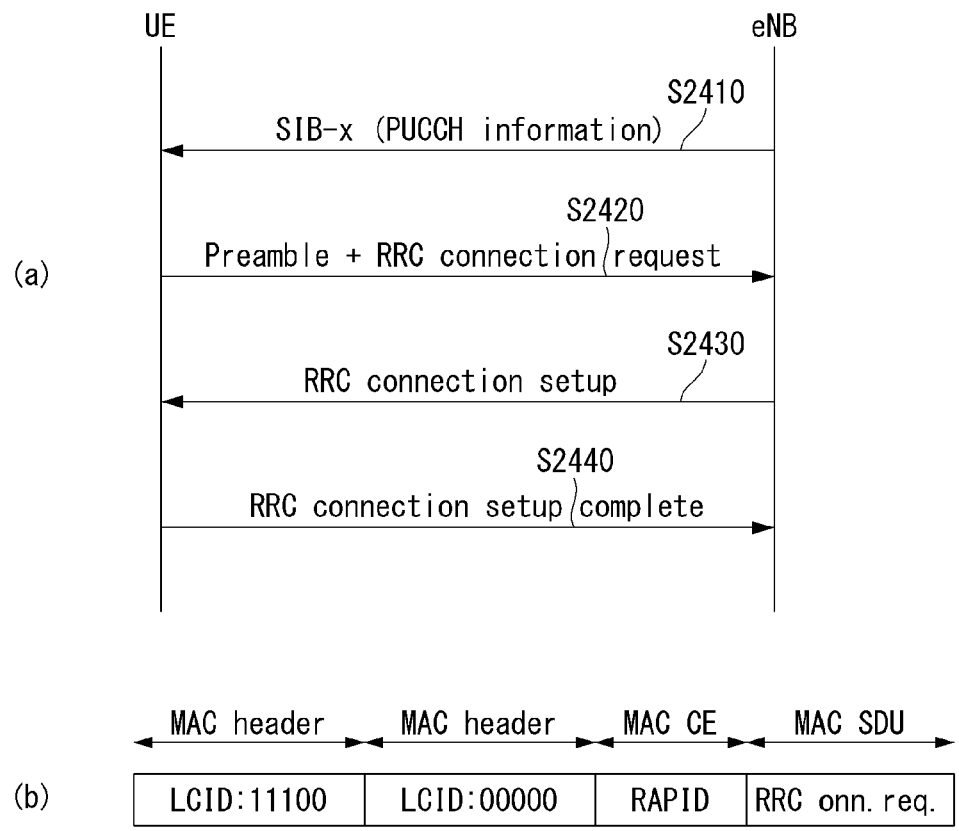

[FIG. 25]
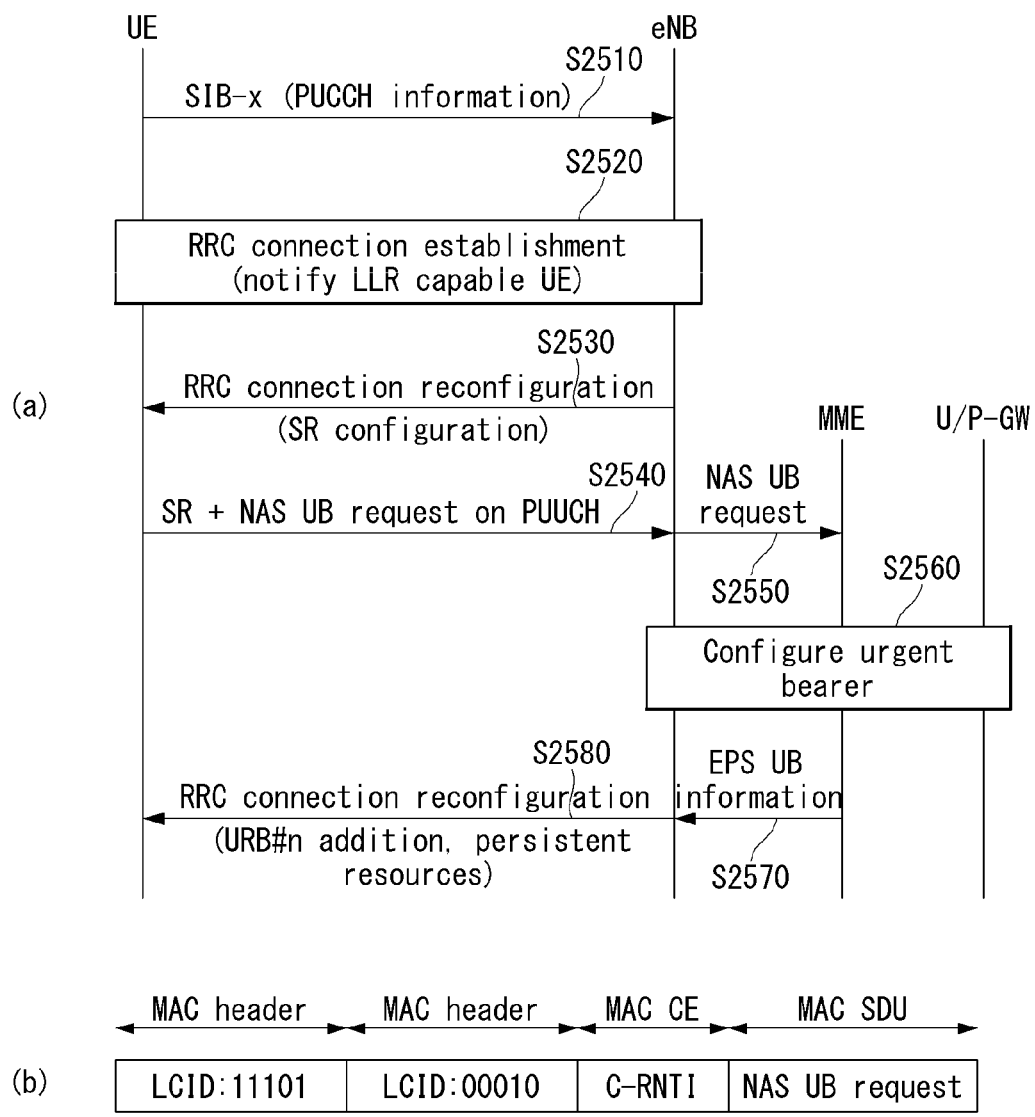

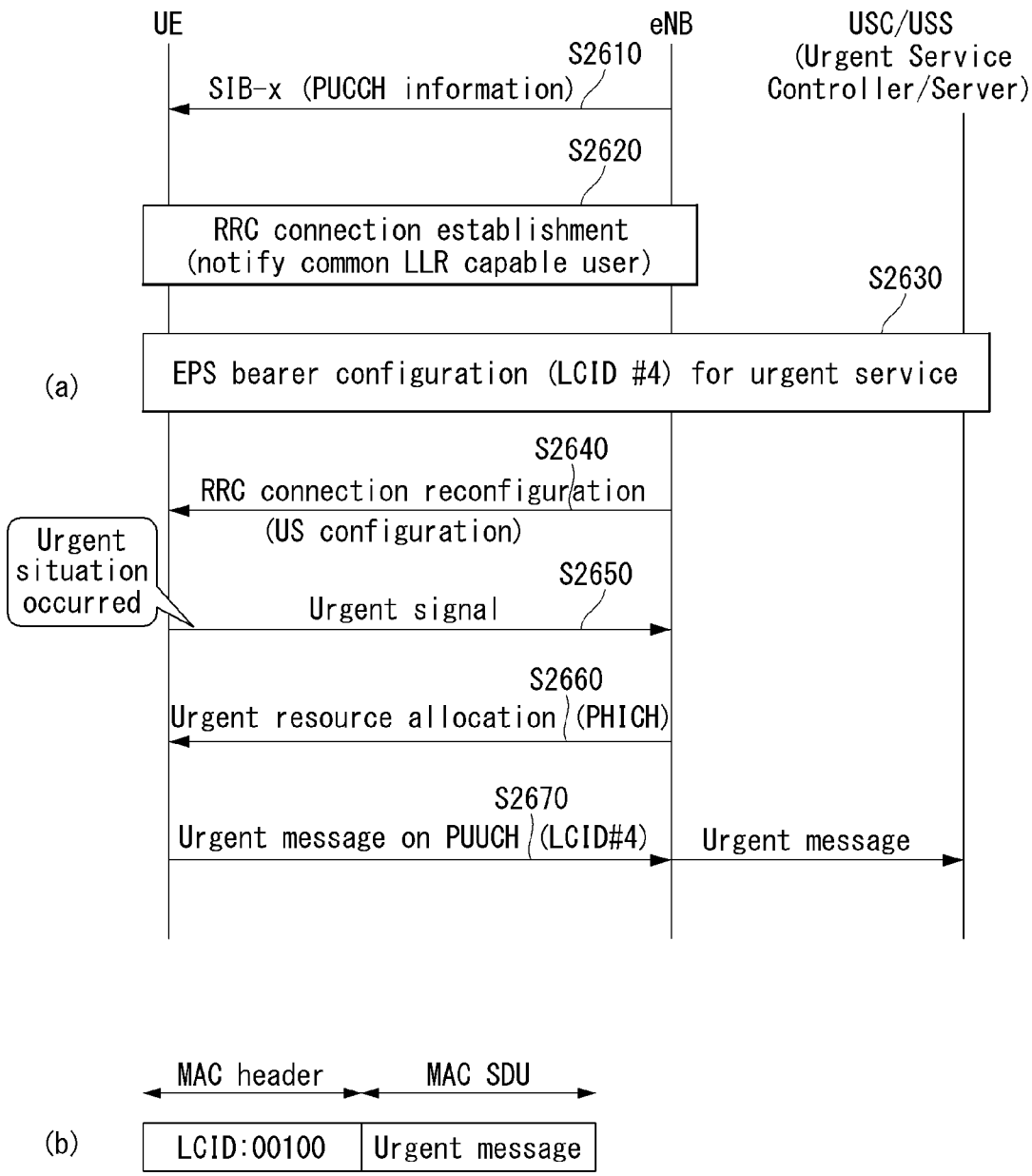
[FIG. 26]

【FIG. 27】
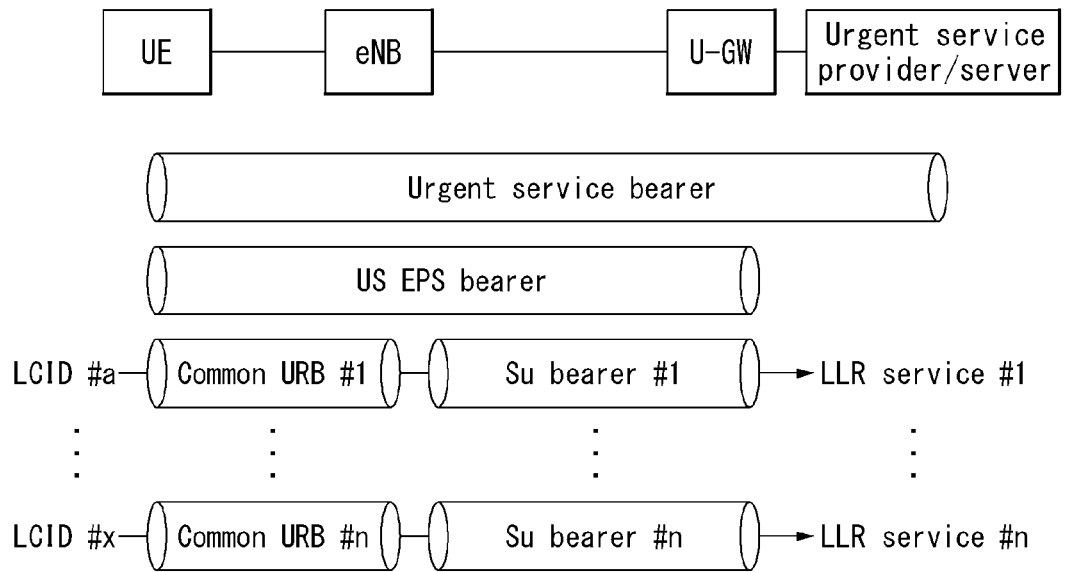
【FIG. 28】
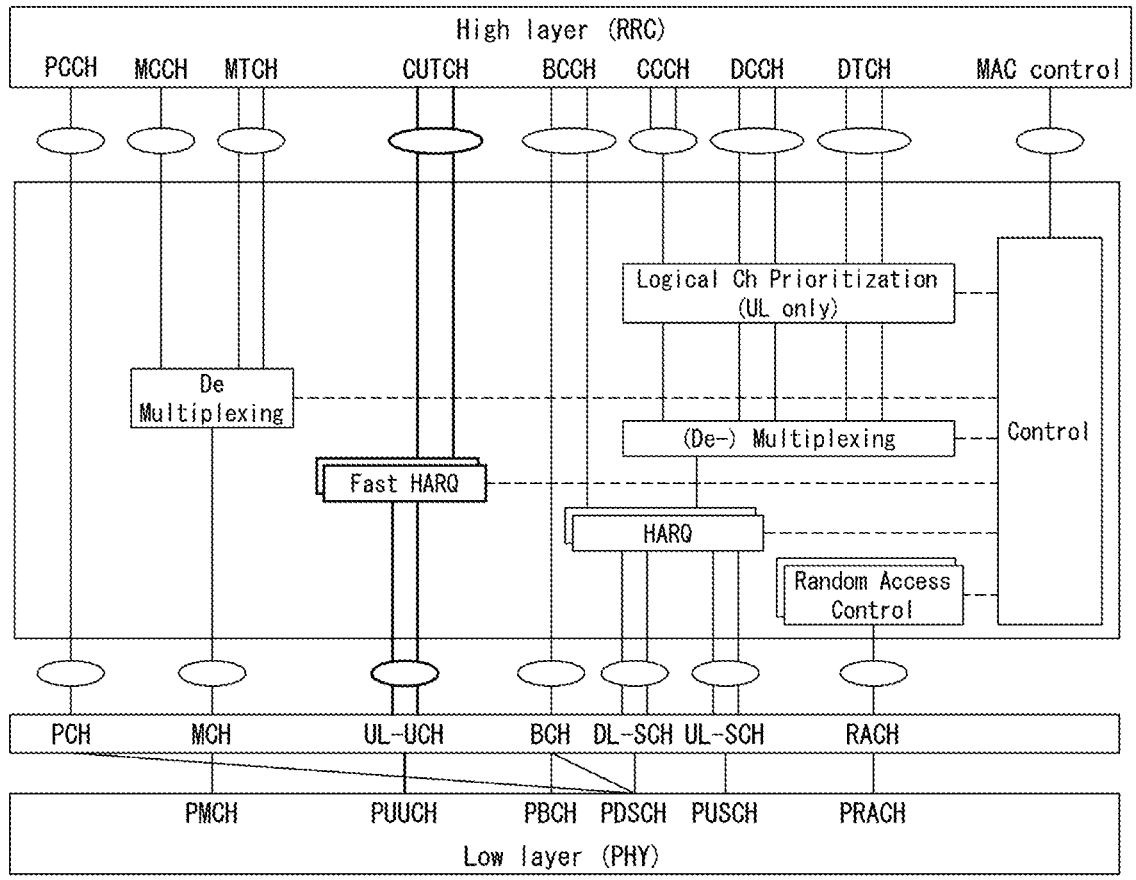

[FIG. 29]
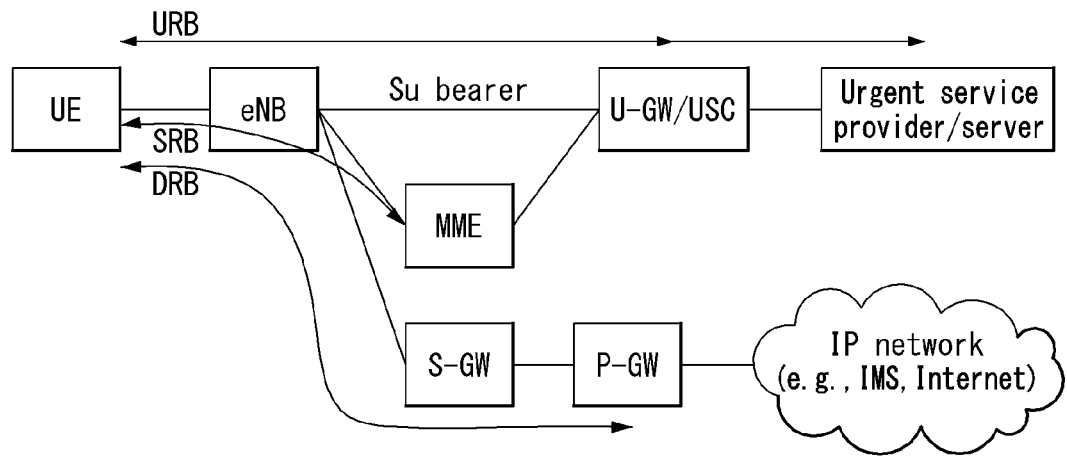
[FIG. 30]
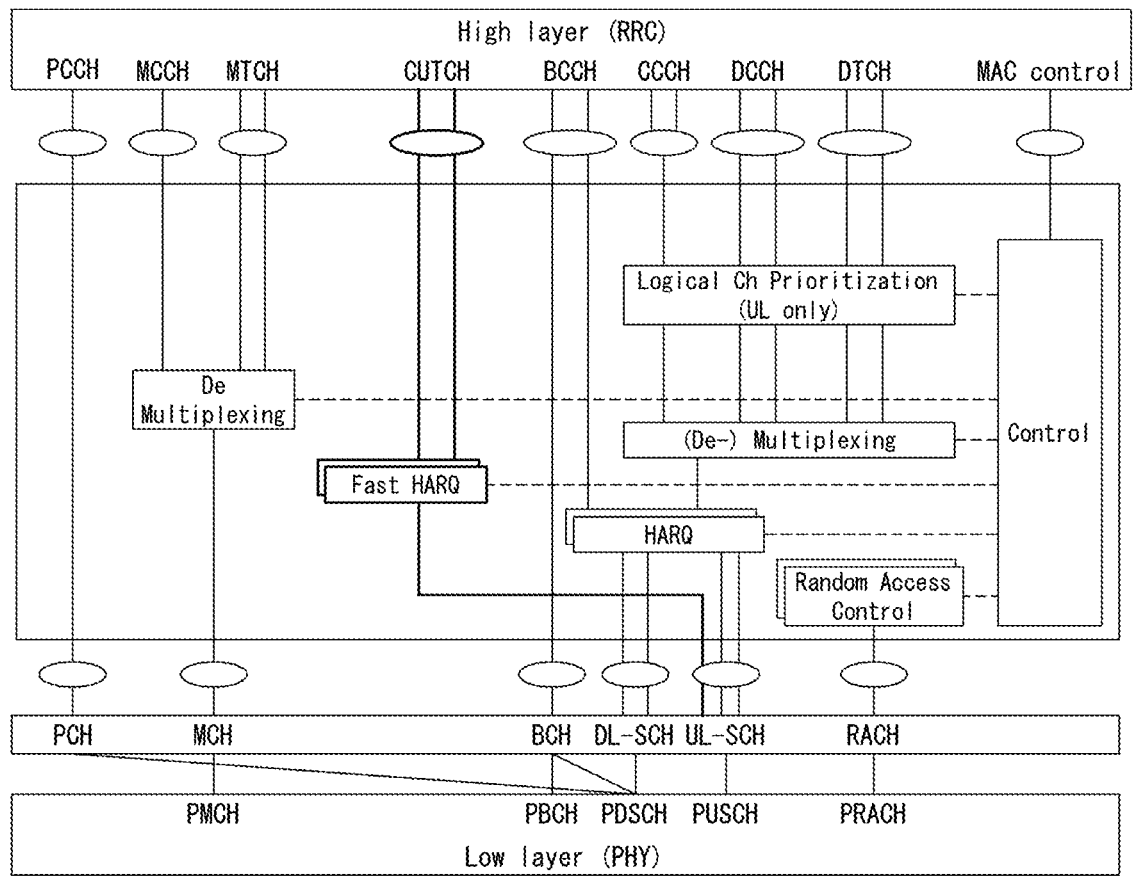

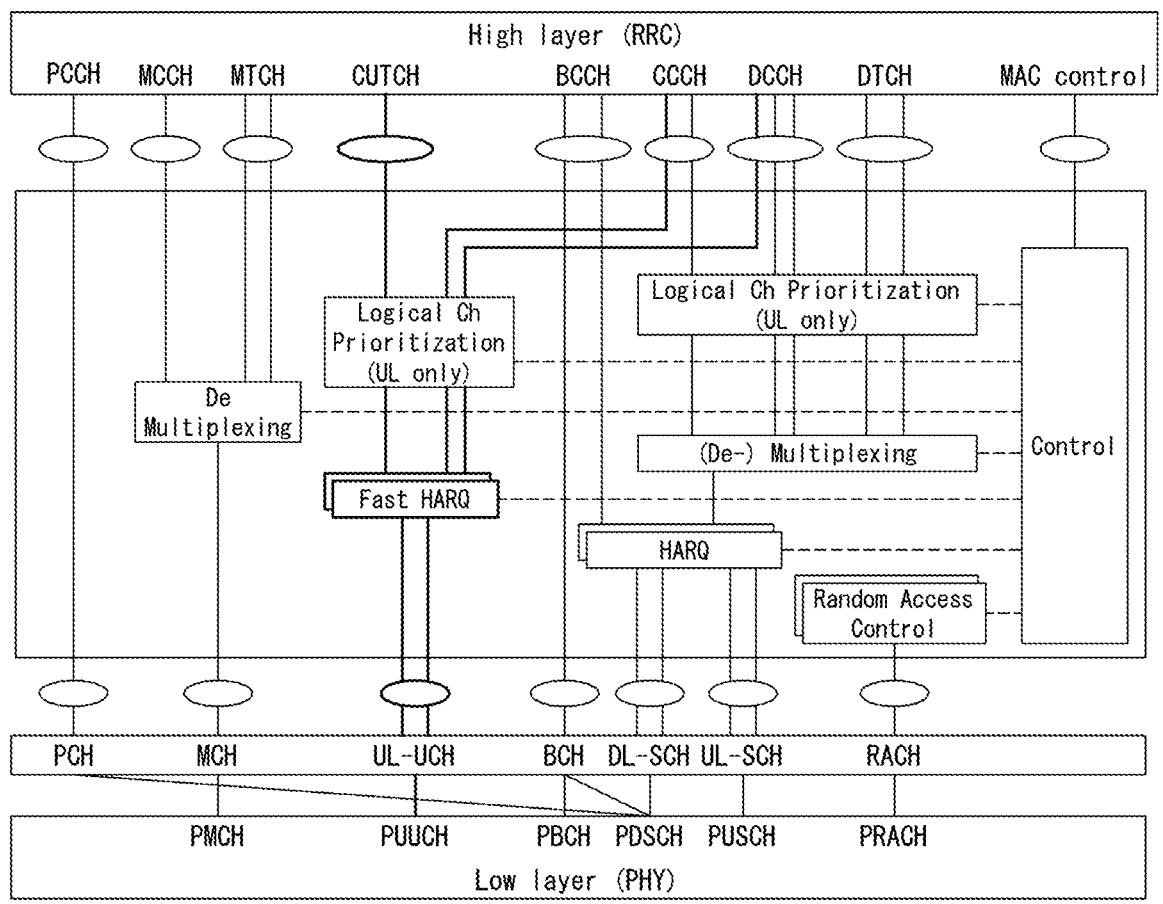
[FIG. 31]

[FIG. 32]
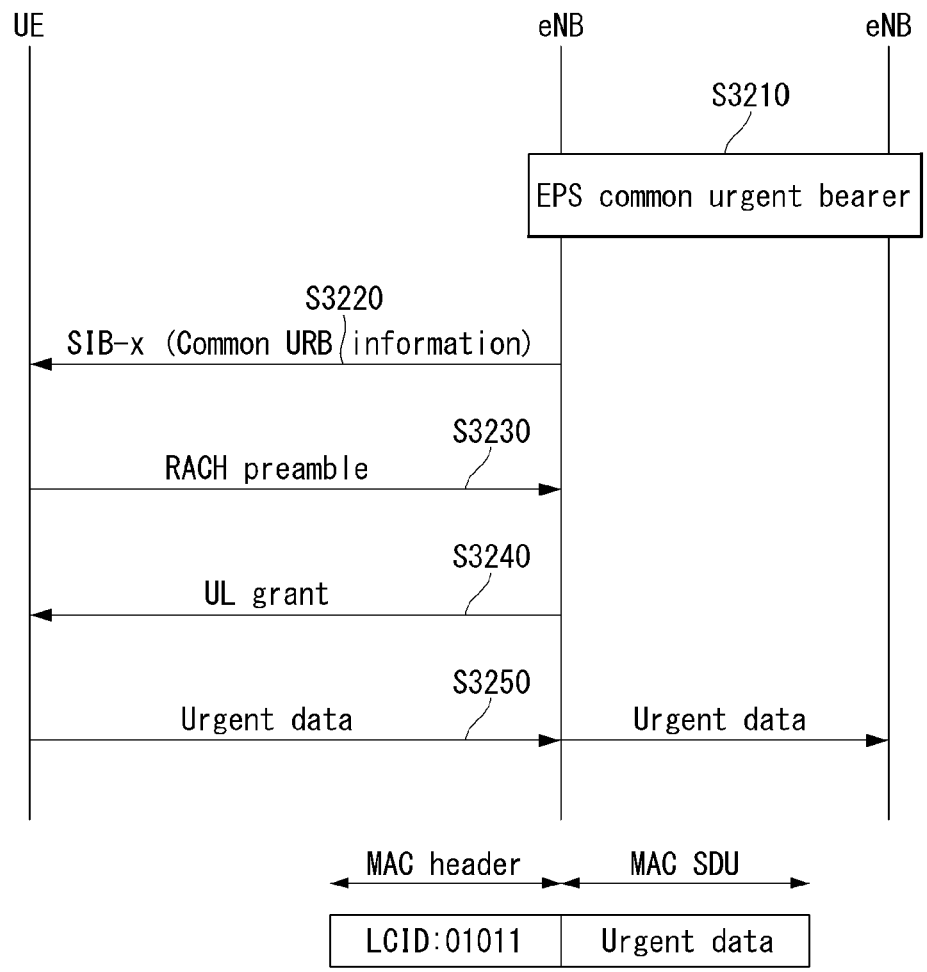

[FIG. 33]
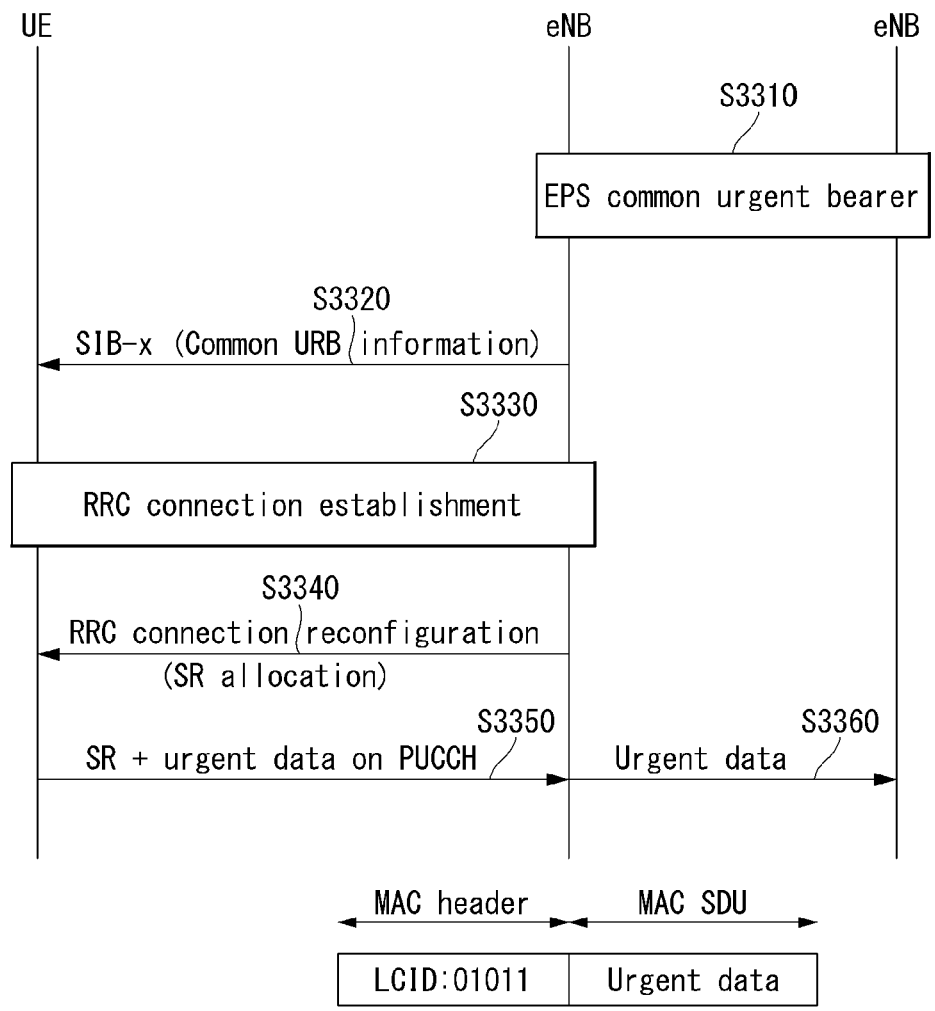
[FIG. 34]
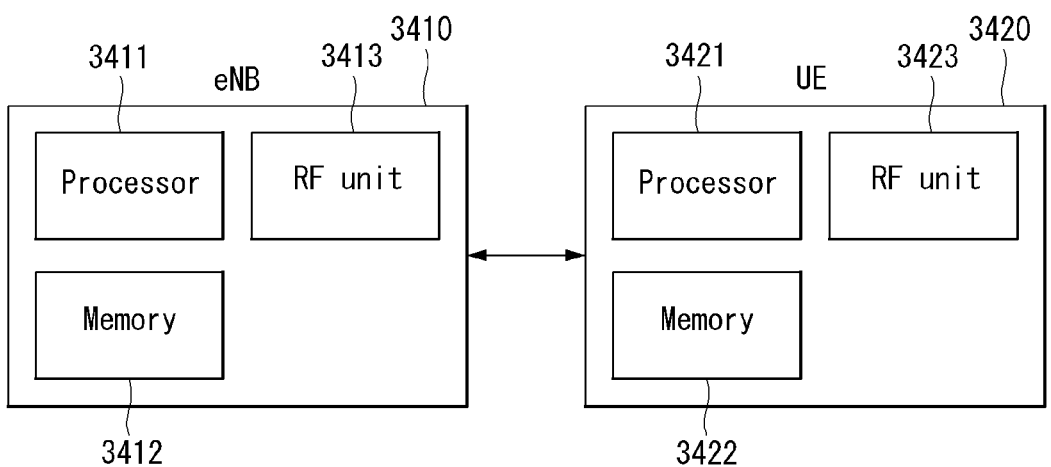

METHOD FOR TRANSMITTING UPLINK DATA IN WIRELESS COMMUNICATION SYSTEM AND DEVICE FOR SAME

CROSS-REFERENCE TO RELATED APPLICATIONS

This application is a continuation of U.S. patent application Ser. No. 15/735,141, filed on Dec. 8, 2017, now U.S. Pat. No. 10,440,695, which is the National Stage filing under 35 U.S.C. 371 of International Application No. PCT/KR2015/006671, filed on Jun. 30, 2015, the contents of which are hereby incorporated by reference herein in their entirety.

TECHNICAL FIELD

This specification relates to a wireless communication system and, more particularly, to a method for a UE to transmit uplink data to an eNB and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of this specification is to provide a method of processing data that requires a different QoS by applying a different QoS to the data in an MAC layer and a PHY layer.

Furthermore, an object of this specification is to provide a method for processing uplink data more rapidly by defining or configuring a network of a new structure, a new physical channel, a new logical channel and a new bearer for low latency radio communication.

Technological objects to be achieved by the present invention are not limited to the aforementioned objects, and other objects that have not been described may be clearly understood by a person having ordinary skill in the art to which the present invention pertains from the following description.

Technical Solution

In this specification, a method for transmitting uplink data (UL data) in a wireless communication system is performed by the UE, and includes the steps of receiving control information related to data transmission of a low latency radio service (LLR service) from an eNB; and transmitting the data of the low latency radio service to the eNB through an urgent channel based on the received control information, wherein the control information includes at least one of urgent bearer information and urgent channel information defined for the data transmission of the low latency radio service.

Furthermore, in this specification, the urgent channel is a channel through urgent data satisfying specific conditions is transmitted, and the urgent data transmitted through the urgent channel is not multiplexed with other common data, and a separate hybrid automatic retransmit request (HARQ) procedure is performed on the urgent data.

Furthermore, in this specification, the urgent channel is defined as a physical uplink urgent channel (PUUCH) in a physical layer, and the physical uplink urgent channel (PUUCH) is mapped to the uplink-urgent channel (UL-UCH) or uplink-shared channel (UL-SCH) of a medium access control (MAC) layer.

Furthermore, in this specification, the uplink-urgent channel (UL-UCH) is mapped to a common urgent transport channel (CUTCH).

Furthermore, in this specification, the data of the low latency radio service includes an MAC header and an MAC service data unit (SDU), and the MAC header includes a logical channel ID (LCID) field indicative of the type of data transmitted through a PUUCH.

Furthermore, in this specification, the physical uplink urgent channel (PUUCH) is any one of contention resources, urgent preemption resources, persistent resources, fallback scheduling resources according to a contention resource collision, and predefined UL resources.

Furthermore, this specification further includes the step of configuring an urgent bearer based on the received control information.

Furthermore, in this specification, the urgent bearer is a common urgent radio bearer (common URB), and the step of configuring the urgent bearer is the step of configuring the common urgent radio bearer (common URB) along with the eNB.

Furthermore, in this specification, the urgent bearer is mapped to an urgent evolved packet core (EPC) bearer, and the urgent EPC bearer is divided into a common urgent radio bearer (common URB) and an Su bearer.

Furthermore, in this specification, the urgent bearer is a passage generated between a UE, an eNB, an urgent gateway (U-GW), an urgent service provider and an urgent service server, the urgent EPC bearer is a passage generated between a UE, an eNB and an urgent gateway (U-GW), the common URB is a passage generated between a UE and an eNB, and the Su bearer is a passage generated between an eNB and an urgent gateway (U-GW).

Furthermore, in this specification, the common URB is configured in a cell in common, and a plurality of common URBs is configured depending on the type of service and quality of service (QoS).

Furthermore, in this specification, priority is set between the plurality of common URBs.

Furthermore, in this specification, the urgent bearer information includes at least one of EPC urgent bearer ID information of a common URB, service ID list information indicative of the ID of a service supportable through the common URB, PDCP configuration information, RLC configuration information, and logical channel ID information indicative of a logical channel mapped to the common URB.

Furthermore, in this specification, the control information is received from the eNB through system information.

Furthermore, in this specification, a user equipment for transmitting uplink (UL) data in a wireless communication system includes a radio frequency (RF) unit for transmitting/receiving a radio signal; and a processor functionally connected to the RF unit, wherein the processor performs control so that control information related to data transmission of a low latency radio service (LLR service) is received from an eNB and the data of the low latency radio service is transmitted to the eNB through an urgent channel based on the received control information, and the control information includes at least one of urgent bearer information and urgent channel information defined for the data transmission of the low latency radio service.

Advantageous Effects

This specification has an effect in that multiplexing and logical channel prioritization can be prevented from being performed between urgent data and common data by defining an urgent data transmission-related new physical channel and the logical channel of a new MAC layer mapped thereto.

Furthermore, accordingly, urgent data can be transmitted safer and faster than common data because the independent data transmission and processing of the urgent data are made possible.

Furthermore, this specification has an effect in that urgent data can be transmitted more rapidly because a common URB is newly defined without a dedicated resource (bearer) configuration for urgent data transmission and used.

Furthermore, this specification has an effect in that it can provide a service different from common data through new logical channel (CUTCH) mapping for an urgent service.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included to provide a further understanding of this document and are incorporated on and constitute a part of this specification illustrate embodiments of this document and together with the description serve to explain the principles of this document.

FIG. 1 shows an example of the network configuration of an evolved universal terrestrial radio access network (E-UTRAN) to which the present invention may be applied.

FIG. 2 shows radio interface protocol architecture between a UE and the E-UTRAN in a wireless communication system to which the present invention may be applied.

FIG. 3 is a diagram for illustrating physical channels used in 3GPP LTE/LTE-A systems and a common signal transmission method using the physical channels to which the present invention may be applied.

FIG. 4 shows the structure of a radio frame in 3GPP LTE/LTE-A to which the present invention may be applied.

FIG. 5 is a diagram illustrating a resource grid for one downlink slot in a wireless communication system to which the present invention may be applied.

FIG. 6 shows the structure of a downlink subframe in a wireless communication system to which the present invention may be applied.

FIG. 7 shows the structure of an uplink subframe in a wireless communication system to which the present invention may be applied.

FIG. 8 is a diagram illustrating an MAC PDU used in an MAC entity in a wireless communication system to which the present invention may be applied.

FIGS. 9 and 10 illustrate the subheaders of an MAC PDU in a wireless communication system to which the present invention may be applied.

FIG. 11 is a diagram illustrating the format of an MAC control element for a buffer status report in a wireless communication system to which the present invention may be applied.

FIG. 12 is a diagram illustrating an uplink resource allocation process of a UE in a wireless communication system to which the present invention may be applied.

FIG. 13 is a diagram for illustrating latency in a control plane (C-plane) that is required for 3GPP LTE-A to which the present invention may be applied.

FIG. 14 is a diagram showing an example of a random access process to which the present invention may be applied.

FIG. 15 is a flowchart illustrating an example of an emergency call procedure in the LTE system.

FIG. 16 is a diagram showing an example of mapping between a logical channel and a transport channel.

FIG. 17 is a diagram showing an example of logical channel prioritization in the LTE system.

FIG. 18 is a diagram showing an example of a service data flow (SDF) and EPS bearers in LTE.

FIG. 19 is a diagram showing an example of a bearer structure in a wireless communication system.

FIG. 20 is a diagram showing an example of an urgent service channel and MAC structure proposed by this specification.

FIG. 21 is a diagram showing an example of a PUUCH resource proposed by this specification.

FIG. 22 is a diagram showing another example of a PUUCH resource proposed by this specification.

FIG. 23 is a flowchart illustrating an example of a fast BSR transmission method proposed by this specification.

FIG. 24 is a flowchart illustrating an example of a method of transmitting a fast RRC connection request message proposed by this specification.

FIG. 25 is a flowchart illustrating an example of a fast radio bearer configuration message transmission method proposed by this specification.

FIG. 26 is a flowchart illustrating an example of a fast data transmission method proposed by this specification.

FIG. 27 is a diagram showing an example of an urgent bearer (UB) structure proposed by this specification.

FIG. 28 is a diagram showing an example of the mapping relation of new logical channels proposed by this specification.

FIG. 29 is a conceptual diagram showing an example of an urgent radio bearer proposed by this specification.

FIGS. 30 and 31 are diagrams showing examples of the mapping relation of logical channels for urgent data transmission proposed by this specification.

FIG. 32 is a flowchart illustrating an example of a method of transmitting, by a UE in the idle state, urgent data using a common URB which is proposed by this specification.

FIG. 33 is a flowchart illustrating an example of a method of transmitting, by a UE in the connection mode state, urgent data using a common URB which is proposed by this specification.

FIG. 34 illustrates a block diagram of a wireless communication apparatus to which the methods proposed by this specification may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(*a*) shows the respective layers of the radio protocol control plane, and FIG. 2(*b*) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , NRB×12−1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9(a)), otherwise, the 15-bit L field may be used (FIG. 9(b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11(a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11(b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(*b*) exemplifies the UL resource allocation procedure for actual data in case that the UL radio resources for the BSR are allocated to a UE.

Referring to FIG. 12(*b*), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

FIG. 13 is a diagram for describing a latency in C-plane required in 3GPP LTE-A to which the present invention can be applied.

Referring to FIG. 13, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized
Random Access Channel (RACH) Procedure FIGS. 14*a* and 14*b* illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 14*a* illustrates one example of a contention-based random access procedure, and FIG. 14*b* illustrates one example of a non-contention based random access procedure.

First, the contention-based random access procedure will be described with reference to FIG. 14*a*.

The UE receives information about random access from the eNB through system information and stores the received information. Afterwards, in case random access is needed, the UE transmits a random access preamble (which is also called a message 1) to the eNB S1401.

If the eNB receives a random access preamble from the UE, the eNB transmits a random access response message (which is also called a message 2) to the UE S1402. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1403. At this time, uplink transmission may be described as scheduled transmission.

After receiving the uplink transmission from the UE, the eNB transmits a message for contention resolution (which is also called a message 4) to the UE through a downlink shared channel (DL-SCH) S1404.

Next, a non-contention based random access procedure will be described with reference to FIG. 14*b*.

Before the UE transmits a random access preamble, the eNB allocates a non-contention random access preamble to the UE S1411.

The non-contention random access preamble can be allocated through a handover command or dedicated signaling such as signaling through the PDCCH. In case non-contention random access preamble is allocated to the UE, the UE transmits the allocated non-contention random access preamble to the eNB S1412.

Afterwards, similarly to the S1402 step of the contention-based random access procedure, the UE can transmit a random access response (which is also called a message 2) to the UE S1413.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Emergency Call

FIG. 15 is a flowchart illustrating an example of an emergency call procedure in the LTE system.

Major procedures for performing an emergency call are described with reference to FIG. 15.

(1) EMERGENCY ATTACH REQUEST: an RRC connection request, an NAS Attach request

In order to perform Emergency Attach, a UE sets an Attach Type and Request Type as "emergency." If the UE does not have a valid GUTI or a valid packet temporary mobile subscriber identity (P-TMSI) is no available, an international mobile subscriber identity (IMSI) is included.

The international mobile equipment identity (IMEI) is included if the UE does not have an IMSI, a valid GUTI and a valid P-TMSI.

If an MME has been configured to not support Emergency Attach, the MME rejects an attach request whose Attach Type indicates "emergency."

(2) Create Session Request

A serving GW generates a new entry in its own EPS bearer table and transmits a Create Session Request message to a PDN GW indicated by a PDN GW received in a previous step.

If a Create Default Bearer Request message includes an emergency access point name (APN), the PDN GWs do not perform confirmation for a maximum APN limit.

If attached UEs are for emergency, the IMSI is included. If the IMSI cannot be authenticated, the IMSI is indicated as being unauthenticated.

(3) Create Session Response

The P-GW generates a new entry in the EPS bearer context table of the P-GW and generates a charging ID for a default bearer.

(4) EMERGENCY ATTACH ACCEPT: RRC connection Reconfiguration, NAS Attach Accept

For Emergency Attach, the MME determines an UE-AMBR so that it is used by an eNB from an APN AMBR received from the S-GW.

A new MME transmits an Attach Accept message to the eNB. The Attach Accept message is included in an Initial Context Setup Request message corresponding to an S1_MME control message.

Furthermore, the S1_MME control message includes a TEID in the S-GW used in the user plane and the address of the S-GW for the user plane and AS security context information for the UE, a handover limit list, an EPS bearer QoS, an UE-AMBR, and an EPS bearer identity.

If an attached UE is for emergency, for example, there is no AS security context information included in an S1 control message with respect to UEs in which emergency EPS bearers only have been established. If the UE cannot be authenticated, the security of an NAS level is not present.

An emergency service support indicator notifies the UE that emergency bearer services are supported.

For example, the UE is allowed to request a PDN connection for emergency services.

The eNodeB transmits an RRC connection reconfiguration message, including an EPS Radio Bearer Identity, to the UE.

(5) Emergency Attach Complete: RRC connection Reconfiguration complete, NAS attach complete The UE transmits an RRC connection reconfiguration complete message to the eNB.

Thereafter, the eNB transmits an Initial Context Response message to the new MME.

Furthermore, the UE transmits a Direct Transfer message to the eNB. The Direct Transfer message includes an Attach Complete message.

The Attach Complete message includes an EPS Bearer Identity, an NAS sequence number and NAS-MAC.

The eNB forwards the Attach Complete message to the new MME through an UL NAS Transport message.

After the Attach Accept message is transmitted, if the UE obtains a PDN address, the UE transmits UL packets to the eNB to be subsequently tunneled to the S-GW and the PDN-GW.

Attach Procedure for EPS Services

When a UE starts an Attach procedure for emergency bearer services, the UE includes information indicative of "EPS Emergency Attach" within an EPS Attach Type IE.

If the UE has been attached for emergency bearer services and does not have a valid GUTI, P-TMSI or IMSI, an IMEI is included in an EPS mobile identity IE.

During an Attach procedure for emergency bearer services, the MME may skip an authentication procedure although EPS security context cannot be used and the MME does not directly perform a security mode control procedure.

FIG. 16 is a diagram showing an example of mapping between a logical channel and a transport channel.

Specifically, FIG. 16a shows an example of mapping between a downlink logical channel and a downlink transport channel, and FIG. 16b shows an example of mapping between an uplink logical channel and an uplink transport channel.

Referring to FIG. 16a, a paging control channel (PCCH) is mapped to a paging channel (PCH), and a broadcast control channel (BCCH) is mapped to a broadcast channel (BCH) or a downlink shared channel (DL-SCH).

A common control channel (CCCH), a dedicated control channel (DCCH) and a dedicated traffic channel (DTCH) are mapped to the DL-SCH.

A multicast control channel (MCCH) and a multicast traffic channel (MTCH) are mapped to a multicast channel (MCH).

Specifically, each logical channel type is defined depending on which type of information is transmitted. A logical channel includes two types of a control channel and a traffic channel.

The control channel is used for the transmission of control plane information.

The BCCH is a downlink channel for broadcasting system control information. The PCCH is a downlink channel through which paging information is transmitted, and is used by a network when the network is unaware of the location of a UE. The CCCH is a channel through which control information between a UE and a network is transmitted, and is used by a UE when the UE does not have an RRC connection with a network. The MCCH is a point-to-multipoint downlink channel used to transmit multimedia broadcast multicast service (MBMS) control information, and is transmitted to UEs that receive MBMS. The DCCH is a point-to-point bidirectional channel through which dedicated control information is transmitted between a UE and a network, and is used by a UE having an RRC connection.

The traffic channel is used for the transmission of user plane information.

The DTCH is a point-to-point channel for the transmission of user information, and is present in both the uplink and the downlink. The MTCH a point-to-multipoint downlink channel for the transmission of traffic data, and is used for a UE that receives MBMS.

The transport channel is classified depending on how data is transmitted according to which characteristics through a radio interface.

The BCH has a predefined transport format that is broadcasted in the entire cell area and fixed. The DL-SCH is characterized by the support of a hybrid automatic repeat request (HARQ), the support of dynamic link adaptation according to a change of modulation and coding and transmission power, the possibility of broadcasting, the possibility of beamforming, the support of dynamic/semi-static resource allocation, the support of discontinuous reception (DRX) for UE power saving, and the support of MBMS transmission.

The PCH is characterized by DRX support for UE power saving and broadcasting to the entire cell area. The MCH is characterized by broadcasting to the entire cell area and MBMS single frequency network (MBSFN) support.

Referring to FIG. 16b, a common control channel (CCCH), dedicated control channel (DCCH) and dedicated traffic channel (DTCH) are mapped to an uplink shared channel (UL-SCH).

FIG. 17 is a diagram showing an example of logical channel prioritization in the LTE system.

First, data transmitted/received between a UE and an eNB generates a different data radio bearer (DRB) depending on a service feature. Each DRB may be mapped to a specific dedicated traffic channel (DTCH).

In this case, a maximum of 32 DRBs of LTE may be generated, and thus values of 1 to 32 may be assigned to DRB IDs.

Furthermore, a DRB transmitted in a DTCH may be mapped to a logical channel ID (LCID) between 3-10, and one DRB ID may be mapped to an LCID for one DTCH.

Furthermore, a maximum of 8 DTCHs which may be generated in LTE may be mapped to a logical channel group (LCG) depending on the service type of DRB. This means that an LCID for one or more DTCHs may be mapped to a single LCG ID.

In this case, the LCG ID is a unit on which a UE reports a buffer status to an eNB.

Data transmitted through a DTCH logical channel is mapped to a downlink shared channel (DL-SCH) or uplink shared channel (UL-SCH) of the MAC layer, and is mapped to the PDSCH and PUSCH of the PHY layer and transmitted.

In this case, the MAC layer enables data, transmitted/received to/from a specific UE and generated from different DTCH logical channels, to be multiplexed into one physical resource and transmitted.

This enables multiplexed data to be configured into a single transport block and to be transmitted on the same resource and enables the same HARQ processes to be performed.

LTE provides a logical channel prioritization function of assigning priority to a logical channel with respect to the uplink data of a UE so that the UE can transmit data of high priority more rapidly.

In this case, in order to prevent the starvation phenomenon of data transmitted from a logical channel having low priority, a prioritised bit rate (PBR) is set for each logical channel so that the data of a channel having high priority can be transmitted using resources of a higher rate.

As shown in FIG. 17, the data of a specific DRB is mapped to a logical channel and has a PBR depending on priority. After data corresponding to a set PRB is allocated to resources depending on its priority, the data is transmitted using all of the allocated resources.

In this case, data generated from an SRB may have a PRB infinity value. This is for enabling all of data to be transmitted to be transmitted using allocated resources at once.

FIG. 18 is a diagram showing an example of a service data flow (SDF) and EPS bearers in LTE.

That is, FIG. 18 shows an example of mapping of EPS bearers and IP flows in the LTE system.

The SDF provides QoS corresponding to service with respect to user traffic (IP flows). The EPS bearer provides QoS between a UE and a P-GW in the EPS transfer network.

When the SDF is transmitted to a user through an EPS, it is mapped to an EPS bearer capable of providing proper QoS according to a QoS rule installed on the P-GW and transferred.

The EPS bearer may be set as two types below.

(1) Default EPS bearer

A default EPS bearer is established during an Attach procedure, and allocates an IP address to a UE.

The default EPS bearer does not have a specific QoS, and a nominal QoS is simply applied to the default EPS bearer.

(2) Dedicated EPS bearer

In general, a dedicated EPS bearer is established during call setup after the idle mode, but may also be established during an Attach procedure.

The dedicated EPS bearer does not allocated any additional IP address to a UE.

Furthermore, the dedicated EPS bearer is linked to a specific default EPS bearer and has a guaranteed specific QoS.

FIG. 19 is a diagram showing an example of a bearer structure in a wireless communication system.

That is, FIG. 19 shows the relation between an E-RAB, S5/S8 Bearer, Radio Bearer and S1 bearer for an EPS bearer.

As shown in FIG. 19, the EPS bearer is mapped to a Radio Bearer between a UE and an eNB, an S1 Bearer between the eNB and an S-GW, and an S5/S8 Bearer between the S-GW and a P-GW in a one-to-one manner. In this case, a radio bearer corresponding to a radio section means a data radio bearer. When an IP flow requiring a new QoS level is generated, a new DRB may be added.

In LTE, a signaling radio bearer (SRB) is also defined in addition to a DRB from among Radio bearers. SRBs 0, 1 and 2 are defined depending on the state of a UE as passages for control information which may be transmitted between a UE and an eNB/MME. The definition of each SRB is as follows.

SRB 0: a UE not having an RRC connection may transmit a control message (e.g., RRC connection request/setup message) transmitted in a CCCH through the SRB 0.

SRB 1: in the case of a UE whose RRC connection has been completed (RRC Connection Setup Complete), it is defined that the SRB 1 has been configured. The UE may transmit a control message (e.g., RRC message or NAS attach/service request) transmitted in a DCCH through the SRB 1.

SRB 2: in the case of a UE whose NAS configuration has been completed (RRC Connection Reconfiguration Complete), it is defined that the SRB 2 has been configured. The UE may transmit a related NAS control message through a corresponding bearer.

The bearers shown in FIG. 19 are described in more detail.

When the UE is connected to a packet data network (PDN) (peer entity), a PDN connection is generated, and the PDN connection is also called an EPS session.

The PDN is an external or internal Internet protocol (IP) network of an operator and provides a service function, such as the Internet or IP Multimedia Subsystem (IMS).

The EPS session has one or more EPS bearers. The EPS bearer is the transmission path of traffic generated between a UE and a PDN GW in order for the EPS to transfer user traffic. One or more EPS bearers may be configure per UE.

Each EPS bearer may be divided into an E-UTRAN radio access bearer (E-RAB) and an S5/S8 bearer. The E-RAB may be divided into a radio bearer (RB) and an S1 bearer. That is, one EPS bearer corresponds to one RB, one S1 bearer or one S5/S8 bearer.

The E-RAB transfers the packet of an EPS bearer between the UE and the EPC. When the E-RAB is present, the E-RAB bearer and the EPS bearer are mapped in a one-to-one manner. A data radio bearer (DRB) transfers the packet of the EPS bearer between the UE and the eNB. When the DRB is present, the DRB and the EPS bearer/E-RAB are mapped in a one-to-one manner. The S1 bearer transfers the packet of the EPS bearer between the eNB and the S-GW. The S5/S8 bearer transfers the EPS bearer packet between the S-GW and the P-GW.

The UE binds a service data flow (SDF) to an EPS bearer of an uplink direction. The SDF is an IP flow in which user traffic has been classified (filtered) for each service or a collection of IP flows. A plurality of SDFs includes a plurality of uplink packet filters and thus may be multiplexed with the same EPS bearer. The UE stores mapping information between an uplink packet filter and a DRB in order to bind the SDF and the DRB in the uplink.

The P-GW binds the SDF to an EPS bearer of a downlink direction. A plurality of SDFs includes a plurality of DL packet filters and thus may be multiplexed with the same EPS bearer. The P-GW stores mapping information between the DL packet filter and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A UE may have one default bearer and one or more dedicated bearers per PDN. A minimum default bearer having an EPS session for one PDN is called a default bearer.

The EPS bearer may be classified based on an identity. The EPS bearer identity is allocated by a UE or an MME. A dedicated bearer(s) is combined with a default bearer by a linked EPS bearer identity (LBI).

When the UE is initially connected to a network through an initial Attach procedure, an IP address is allocated to the UE, and thus a PDN connection is generated. In the EPS section, a default bearer is generated. The default bearer is maintained without being released unless the PDN connection with the UE is terminated although there is traffic between the UE and a corresponding PDN. The default bearer is also released when the corresponding PDN connection is terminated. In this case, bearers in all of sections in which the default bearer is formed with the UE are not activated, but an S5 bearer directly connected to the PDN remains intact and an E-RAB bearer (i.e., the DRB and S1 bearer) associated with radio resources is released. Furthermore, when new traffic is generated in the corresponding PDN, an E-RAB bearer is reconfigured and transfers traffic.

If a UE uses service (e.g., video on demand (VoD)) insufficient to receive quality of service (QoS) using a default bearer only while using service (e.g., Internet) through the default bearer, a dedicated bearer is generated on demand of the UE. If traffic of the UE is not present, the dedicated bearer is released. A UE or a network may generate a plurality of dedicated bearers, if necessary.

An IP flow may have a different QoS feature depending on that a UE uses which service. A network determines a control policy for the allocation to QoS of network resources when establishing/modifying an EPS session for the UE and applies the control policy while the EPS session is maintained. This is called policy and charging control (PCC). A PCC rule is determined based on an operator policy (e.g., QoS policy, gate status or a billing method).

The PCC rule is determined for each SDF That is, an IP flow may have a different QoS feature depending on service used by a UE. IP flows having the same QoS are mapped to the same SDF, and the SDF becomes a unit by which the PCC rule is applied.

A policy and charging control function (PCRF) and a policy and charging enforcement function (PCEF) may correspond to major entities that perform such a PCC function.

The PCRF determines a PCC rule for each SDF when an EPS session is generated or changed, and provides it to the P-GW (or PCEF). The P-GW configures a PCC rule for a corresponding SDF, detects an SDF for each transmitted/received IP packet, and applies the PCC rule for the corresponding SDE When the SDF is transmitted to the UE through the EPS, it is mapped to an EPS bearer capable of providing proper QoS depending on a QoS rule stored in the P-GW.

The PCC rule is divided into a dynamic PCC rule and a predefined PCC rule. The dynamic PCC rule is dynamically provided from the PCRF to the P-GW when an EPS session is established/modified. In contrast, the predefined PCC rule has been previously configured in the P-GW and activated/deactivated by a PCRF The EPS bearer includes a QoS class identifier (QCI) and allocation and retention priority (ARP) as basic QoS parameters.

The QCI is a scalar used as a criterion for accessing node-specific parameters that control bearer level packet forwarding treatment. A scalar value has been preconfigured by a network operator. For example, the scalar may be preconfigured as any one of integer values 1 to 9.

A major object of the ARP is to determine whether the establishment or modification request of a bearer has to be accepted or rejected when resources are limited. Furthermore, the ARP may be used to determine that which bearer(s) will be dropped by an eNB in an exceptional resource limit (e.g., handover) situation.

The EPS bearer is divided into a guaranteed bit rate (GBR) type bearer and a non-GBR type bearer depending on a QCI resource form. A default bearer is always a non-GBR type bearer, and a dedicated bearer may be the GBR type or non-GBR type bearer.

The GBR type bearer is a QoS parameter other than a QCI and ARP and has a GBR and a maximum bit rate (MBR). The MBR means that fixed resources are allocated (bandwidth is guaranteed) for each. In contrast, the non-GBR type bearer is a QoS parameter other than a QCI and ARP and has an aggregated MBR (AMBR). The AMBR means that resources are not allocated for each bearer, but a maximum bandwidth capable of being used along with other non-GBR type bearers are allocated.

As described above, when the QoS of an EPS bearer is determined, the QoS of each bearer is determined for each interface. The bearer of each interface provides the QoS of an EPS bearer for each interface, and thus all of the EPS bearer, RB and S bearer have a one-to-one relation.

If a UE uses services insufficient to receive QoS using only a default bearer while using service through a default bearer, a dedicated bearer is generated at the request of the UE (on-demand).

5G has increasing requirements for supporting various real-time application services, such as health care, traffic safety, disaster safety, remote medical control and remote drone control.

Accordingly, 5G has an object of constructing an ultra-low latency system (target latency: E2E or radio 1 ms) having an extremely short response time to the extent that a user cannot become aware of the awkwardness of tactile information belonging to the human's five senses and most sensitive to latency time although the tactile information is provided through the Internet.

Such low latency communication service may be provided to a specific UE (e.g., a health care UE), but may also be provided to a specific service (e.g., remote drone control, traffic safety or disaster safety) of a general UE (e.g., a mobile phone or a vehicle).

That is, the low latency UE means a UE that generates only low latency service, and the general UE means a UE capable of generating both common service and low latency service. In this case, if a general UE generates both common data and low latency data, different processing methods are requested for the two data. However, a communication technology, such as current LTE, may map data requiring different QoS to a specific logical channel and assign different priority, but corresponding data is multiplexed with a single transport block (TB), mapped to the same physical channel and transmitted.

That is, in the current communication technology, a scheme for processing data generated from a different service by applying a different QoS in a layer, such as the MAC/PHY, has not been defined.

The future 5G technology can support that data requiring low latency communication is transmitted more rapidly using a new MAC/PHY channel for low latency radio (LLR), while transmitting common data using the conventional MAC/PHY channel. This may mean that common data and urgent data should not be multiplexed into a single TB in the MAC layer.

In the current communication technology, however, as described above, a mapping method for a different physical channel has not been defined for data that requires a different QoS, and a radio bearer and radio channel suitable for a new 5G urgent service have not been defined.

Hereinafter, a method for processing corresponding urgent data more rapidly if a new physical channel and logical channel for low latency communication are configured and urgent data is transmitted/received, which is proposed by this specification, is described in detail.

FIG. 20 is a diagram showing an example of an urgent service channel and MAC structure proposed by this specification.

Referring to FIG. 20, a physical urgent uplink channel (PUUCH) is mapped to an urgent channel (UL-UCH), and the UL-UCH is mapped to a common control channel (CCCH) or dedicated control channel (DCCH) or dedicated traffic channel (DTCH).

In this case, an HARQ procedure (fast HARQ) and logical channel prioritization procedure different from those of other transport channels are performed in the UL-UCH. Accordingly, data transmitted through the UL-UCH can be transmitted faster than other data.

Hereinafter, a method for transmitting urgent data based on a PUUCH, UL-UCH and newly defined LCID proposed by this specification is described in detail.

PUUCH (Physical Uplink Urgent Channel)

First, a PUUCH newly defined in the PHY layer for urgent data transmission is described.

The reason why the PUUCH is newly defined is for fast data transmission. A physical resource region newly defined in this specification may be divided into (1) a contention resource, (2) an urgent preemption resource, (3) a (semi-)persistent resource, (4) a fallback scheduling resource, and (5) an uplink resource region defined for fast data transmission other than (1) to (4).

Contention Resource

A method of using a contention resource as a PUUCH resource is described with reference to FIG. 21.

FIG. 21 is a diagram showing an example of the PUUCH resource proposed by this specification.

A specific resource region of uplink resources may be defined as a contention resource region.

The contention resource region 2110 may be expressed as a contention based PUSCH zone (CP zone).

The contention resource region may be defined by n contention resource blocks 2120. In this case, the contention resource block may be expressed as a contention based PUSCH resource block (CPRB).

That is, the CP zone may include one or more CPRBs.

In this case, a UE may select one contention resource block and transmit data through the selected contention resource block.

As described above, such a contention resource region, that is, a CP zone, is defined as a PUUCH, and data can be rapidly transmitted through the corresponding PUUCH.

Urgent Preemption Resource

A method of using an urgent preemption resource as a PUUCH resource is described with reference to FIG. 22.

FIG. 22 is a diagram showing another example of a PUUCH resource proposed by this specification.

A specific resource of uplink resources may be configured so that a UE can preempt and use the specific resource in order to transmit urgent data.

If the specific resource (region) is preempted for urgent data transmission, the preempted resource region may be defined as an urgent preemption resource.

That is, the urgent preemption resource may be defined as the PUUCH proposed by this specification.

Referring to FIG. 22, an urgent UE transmits a PUCCH US, providing notification of the generation of an urgent situation, to an eNB (S2210).

Thereafter, when the eNB receives the PUCCH US from the urgent UE, the eNB cancels or postpones a resource that has already been allocated or to be allocated to general UEs, and configures the corresponding cancelled or postponed resource as an urgent preemption resource.

In this case, the urgent UE means a UE that transmits urgent data, and the general UE means a UE other than the urgent UE.

Thereafter, the eNB transmits PHICH ACK, providing notification that the specific resource is an urgent preemption resource and the corresponding urgent preemption resource will be preempted by the urgent UE, to the urgent UE and/or general UEs (S2220).

Thereafter, the urgent UE transmits an urgent message using the corresponding urgent preemption resource (S2230).

In FIG. 22, a subframe corresponding to N=7 correspond to the urgent preemption resource 2210.

That is, an UL resource in which the urgent message is transmitted may be defined as the urgent preemption resource, and the urgent preemption resource may be defined as the PUUCH.

(Semi-)Persistent Resource

A method of using a persistent resource as a PUUCH resource is described.

A persistent resource described in this specification is a resource that belongs to uplink resources and that is persistently or semi-persistently allocated for a specific UE, and only 내에서는 a specific UE may transmit data using a corresponding resource in the section in which a corresponding resource has been configured.

The specific UE may be an urgent UE that transmits urgent data.

If a persistent resource (region) is configured for low latency radio (LLR) service as described above, the corresponding persistent resource region may be defined as a PUUCH.

Fallback Scheduling Resource

Next, a method of using a fallback scheduling resource according to a contention resource collision as a PUUCH resource is described.

If an eNB scheduling resource of uplink resources is retransmitted due to a contention resource collision, the corresponding scheduling resource region may be defined as a PUUCH.

This may be configured so that when the eNB transmits an UL grant, it also transmits indication providing notification that the corresponding resource region is a resource region corresponding to the PUUCH (e.g., indication providing notification of an UL grant scheduled due to a contention resource collision).

Uplink Resource Defined for Fast Data Transmission

Next, a method of using an uplink resource defined for fast data transmission other than the aforementioned (1) to (4) resources as a PUUCH resource is described.

An uplink resource that may be transmitted in a short TTI, such as a short PUSCH (sPUSCH), may be defined as a PUUCH.

The short TTI refers to a TTI shorter than a convention 1 ms TTI (subframe). For example, the short TTI may be defined as 0.2 ms.

The short PUSCH may be defined with respect to a specific subband or may be defined with respect to a specific carrier.

As described above, in this specification, a resource region that belongs to uplink resources and that is newly defined for urgent data transmission is defined as a "physical uplink urgent channel (PUUCH)", and a method of rapidly transmitting data through the PUUCH region is defined.

UL-Urgent Channel (UL-UCH)

Next, an UL-UCH is described in detail.

It is defined that the aforementioned PUUCH defines will be mapped to the UL-UCH of the MAC layer.

This enables an eNB to be aware that data transmitted through the PUUCH is data for transmitting urgent data and enables the eNB to perform a subsequent procedure through a specific MAC header.

Furthermore, in order to perform such an operation, a logical channel ID (LCID) for the UL-UCH is newly defined as in Table 4.

Table 4 below shows an example in which LCIDs for data that may be transmitted through PUUCHs have been defined.

TABLE 4

| Index | LCID values |
| --- | --- |
| 00000 | CCCH |
| 00001-01010 | Identity of logical channel |
| 01011-10111 | Reserved |
| 11000 | UEID |
| 11100 | Random Access Preamble ID |
| 11101 | C-RNTI |
| 11110 | Fast BSR |
| 11111 | Padding |

CCCH, DCCH, DTCH, UEID, RAPID, C-RNTI and Fast BSR values are described with reference to Table 4.

Common control channel (CCCH): value when an LCID index is "00000", and a message transmitted through a CCCH, such as an RRC connection request message, for fast connection establishment, may be transmitted through a PUUCH, and an LCID for recognizing the message is defined.

Dedicated control channel (DCCH): in general, an LCID is set to "1" or "2", an SRB 1 is set as an LCID 1, and an SRB 2 is set as an LCID 2.

For the fast control information transmission of a UE, a message, such as an RRC connection reconfiguration (e.g., fast RB configuration), may be transmitted through a PUUCH, and an LCID for recognizing the message is defined.

Dedicated traffic channel (DTCH): data generated from a specific application service for the fast data transmission of a UE may be transmitted through a PUUCH, and an LCID for identifying the corresponding data is defined.

This may be allocated to data that needs to be urgently transmitted depending on a data service having a new QoS for low latency radio (LLR) service or an implementation of a UE.

UEID, RAPID and the C-RNTI

If data is transmitted using the aforementioned contention resource, the transmission of a UE ID for identifying a UE may also be requested. In this case, MAC control elements, such s an UEID, Random Access Preamble ID and C-RNTI, may be transmitted through a PUUCH, and an LCID for recognizing the MAC control element is defined.

Fast BSR

For fast data resource allocation, information such as a BSR may be transmitted through a PUUCH, and an LCID for recognizing the information is defined.

Urgent Data Transmission Based on Newly Defined LCID

Next, a method of transmitting uplink data through an UL-UCH mapped to a newly defined PUUCH, that is, based on the LCID newly defined in Table 4, is described.

First, a fast BSR transmission method is described with reference to FIG. 23.

Fast BSR Transmission Method

FIG. 23 is a flowchart illustrating an example of a fast BSR transmission method proposed by this specification.

That is, FIG. 23 is a diagram showing a method for transmitting a fast BSR using a PUUCH and the LCID of an UL-UCH.

If a BSR is transmitted using the aforementioned contention resource, a UE transmits the BSR to an eNB through a PUUCH.

In this case, the MAC message format of the BSR transmitted through the PUUCH may be defined as shown in FIG. 23b.

That is, the MAC message format of FIG. 23b transmits a BSR using the LCID of the BSR for the UL-UCH so that the eNB is notified that the BSR is for BSR for specific urgent information transmission.

The fast BSR proposed by this specification may be defined to have the same format as the existing short BSR and long BSR.

Alternatively, unlike in a conventional technology, it may be defined that only a BSR is transmitted without a logical channel group ID (LCG ID).

If a fast BSR proposed by this specification is defined as a short BSR and a long BSR, it is preferred that different LCIDs are allocated to the short BSR and long BSR, respectively.

In this case, if only a BSR is transmitted without an LCG ID, it means that the transmission is BSR transmission providing notification of buffer status information for only data for a specific urgent service. This means that an eNB that has received BSR from a UE has to preferentially allocate a resource for the corresponding UE compared to a BSR for other service of another UE or the corresponding UE (another BSR indicated by a conventional LCG ID and transmitted).

If a UE transmits a BSR to an eNB through a contention resource, a C-RNTI for enabling the eNB to recognize the UE that has transmitted the BSR may be transmitted along with the BSR. This may be defined as in an MAC message format of FIG. 23c.

A method of transmitting a fast BSR is described in more detail with reference to FIG. 23a.

First, a UE receives system information, including PUUCH resource information, from an eNB (S2310). The system information may be transmitted through an SIB-x.

The PUUCH resource information may be contention resource zone information if the PUUCH resource is (1) the contention resource and may be a region (PUSCHU_RB or an Nu value when a preemption resource size is determined) for an urgent preemption resource if the PUUCH resource is (2) the urgent preemption resource.

In this case, x may be 2 to 19.

Thereafter, the UE performs an RRC connection establishment procedure with the eNB based on the system information (S2320).

The UE may notify the eNB that the UE is a UE capable of LLR service through the RRC connection establishment procedure.

Thereafter, the UE receives an RRC connection reconfiguration message from the eNB (S2330).

The RRC connection reconfiguration message includes scheduling report (SR) configuration information.

Thereafter, the UE transmits an SR and BSR through a PUUCH using the PUUCH information received at step S2310 (S2340).

Thereafter, the eNB allocates an uplink grant (UL grant) capable of transmitting uplink data to the UE (S2350).

Thereafter, the UE transmits data, that is, urgent data, to the eNB through the allocated UL grant (S2360).

In FIG. 23b, an LCID index "11110" value included in an MAC header indicates a BSR included in an MAC CE located next.

In FIG. 23c, LCID index "11101" value and "11110" value included in MAC headers indicate the C-RNTI of an MAC CE and the BSR of an the MAC CE, respectively.

Fast RRC Connection Request Message Transmission Method

FIG. 24 is a flowchart illustrating an example of a method of transmitting a fast RRC connection request message proposed by this specification.

That is, FIG. 24 is a diagram showing a method for transmitting a fast RRC connection request using a PUUCH and the LCID of an UL-UCH.

If an RRC connection request message is transmitted using the aforementioned contention resource, the RRC connection request message may be transmitted through a PUUCH.

An MAC message format used in this case may be defined as shown in FIG. 24b.

Furthermore, if a contention resource is transmitted along with an RACH preamble, as shown in FIG. 24b, a corresponding MAC message may include a random access preamble ID (RAPID) MAC CE indicative of a transmitted preamble id and may be transmitted.

In this case, each LCID may be mapped to an LCID defined with respect to an UL-UCH and may be transmitted.

A method of transmitting a fast RRC connection request message is described in more detail with reference to FIG. 24a.

First, a UE receives system information, including PUUCH resource (related) information from an eNB (S2410). The system information may be transmitted through an SIB-x.

The PUUCH resource information may be contention resource zone information if the PUUCH resource is (1) the contention resource, and may mean a region (PUSCHU_RB or an Nu value if a preemption resource size is determined) for an urgent preemption resource if the PUUCH resource is (2) the urgent preemption resource.

Thereafter, the UE transmits an RACH preamble and RRC connection reconfiguration message to the eNB through a PUUCH using the received PUUCH-related information (S2420).

Thereafter, the UE receives an RRC connection setup message from the eNB (S2430).

Thereafter, the UE transmits an RRC connection setup complete message providing notification that RRC connection establishment has been completed to the eNB (S2440).

A signaling radio bearer (SRB) 1 is configured through the transmission/reception of the RRC connection setup complete message.

Method of Transmitting Fast Radio Bearer Configuration Message

FIG. 25 is a flowchart illustrating an example of a fast radio bearer configuration message transmission method proposed by this specification.

That is, FIG. 25 is a diagram showing a method for transmitting an NAS urgent bearer resource allocation request using a PUUCH and the LCID of an UL-UCH If a UE transmits the NAS urgent bearer resource allocation request message to an eNB using the aforementioned contention resource, the NAS urgent bearer resource allocation request message may be transmitted through a PUUCH.

Furthermore, the eNB that has received the NAS urgent bearer resource allocation request message recognizes that it has to transmit the NAS urgent bearer resource allocation request message to an MME and transmits the corresponding message to the MME.

In this case, the urgent bearer resource allocation request message may be a message for requesting a new dedicated and common urgent bearer configuration for a specific urgent service within the existing NAS bearer resource allocation request message or may be an NAS message that has been newly defined in order to request the configuration of a dedicated/common urgent bearer for an urgent service.

Alternatively, if a service that urgently requests a new dedicated bearer configuration from among conventional RBs is started, a message that a UE requests a resource configuration for a new dedicated bearer from a network may mean a conventional NAS bearer resource allocation request message.

The LCID of a DCCH for an SRB 2 may be mapped to an MAC header and transmitted as a recognizer for the message.

Furthermore, as shown in FIG. 25b, in order for the UE in a contention resource to be recognized, an MAC CE including a C-RNTI may be together transmitted in a corresponding MAC message.

A method of transmitting the NAS urgent bearer resource allocation request message is described in more detail with reference to FIG. 25a.

Step S2510 to step S2530 of FIG. 25a are the same as step S2310 to step S2330 of FIG. 23a and a detailed description thereof are omitted, and a difference is chiefly described.

After step S2530, the UE transmits an SR and NAS urgent bearer (UB) (resource allocation) request message to the eNB through a PUUCH (S2540).

Thereafter, the eNB transmits an NAS UB request message to the MM based on the NAS UB request message received at step S2540 (S2550).

Thereafter, an urgent bearer is configured between the eNB, the MME and the U-GW/P-GW (S2560).

Thereafter, the MME transmits UB-related information configured through step S2560, that is, EPS UB information, to the eNB (S2570).

Thereafter, the eNB transmits a persistent resource for the UB and information related to at least one URB addition to the UE through an RRC connection reconfiguration message (S2580).

Through the above procedure, an urgent bearer capable of performing urgent service between the UE and the U-GW is configured.

Fast Data Transmission Method

FIG. 26 is a flowchart illustrating an example of a fast data transmission method proposed by this specification.

That is, FIG. 26 is a diagram showing a method for transmitting fast data using a PUUCH and the LCID of an UL-UCH.

In order to rapidly transmit application data generated from a specific urgent service, as described above, a contention resource, an urgent preemption resource or a PUUCH, such as a persistent resource, may be used.

This method may be configured to transmit data through an UL-UCH and a PUUCH with respect to a DRB that belongs to data transmitted through a data radio bearer (DRB) generated from a dedicated transport channel (DTCH) and that has a specific QCI that must be transmitted rapidly (or a new urgent radio bearer if a new radio bearer for urgent data is configured).

A method for transmitting fast data is described in more detail with reference to FIG. 26a.

Step S2610 and step S2620 of FIG. 26a are the same as step S2310 and step S2320 of FIG. 23 and a detailed description thereof is omitted, and a difference is chiefly described.

After step S2620, an EPC bearer for an urgent service is configured between the UE, the eNB and an urgent service controller (USC)/urgent service server (USS) (S2630). In this case, an LCID related to the EPC bearer may be an LCID #4.

Thereafter, the eNB transmits an RRC connection reconfiguration message including information related to the EPC bearer configured at step S2630, that is, an urgent service (US) configuration, to the UE (S2640).

Thereafter, when an urgent situation is generated, the UE that has detected the situation transmits an urgent signal to the eNB (S2650).

Thereafter, the eNB transmits urgent resource allocation to the UE through a PHICH (S2660).

Thereafter, the UE transmits an urgent message to the eNB through a PUUCH based on the PHICH (S2670).

As shown in FIG. 26b, if the LCID index value of an MAC header is "00100" (LCID #4), this indicates that an MAC SDU located next to the MAC header is an urgent message.

Hereinafter, as another embodiment proposed by this specification, a method for processing data more rapidly when transmitting/receiving urgent data using the definition of a new network configuration for low latency communication, a physical channel/logical channel and a new radio bearer configuration is described.

FIG. 27 is a diagram showing an example of an urgent bearer (UB) structure proposed by this specification.

That is, FIG. 27 shows the relation between a common urgent ratio bearer (URB) and an Su bearer for an urgent service (US) EPC bearer.

The US EPC bearer means the transmission path of traffic generated between a UE and a U-GW in order for an EPC to deliver urgent service traffic.

That is, the US EPC bearer means a passage configured in order for the data of an urgent service to be transmitted to a specific server (urgent service server) outside an EPC network.

Each US EPC bearer may be divided into a common urgent ratio bearer (URB) and an Su bearer.

In this case, the common URB means a passage for transmitting urgent data between a UE and an eNB. The Su bearer means a passage for transmitting urgent data between an eNB and a U-GW.

The URB is a service movement passage for uplink only data transmission of a UE, and refers to a passage for enabling urgent data generated by a UE to be transmitted up to an urgent service server.

Each LCID (LCID #a, . . . , LCID #x) corresponds to each common URB (Common URB #1, . . . , Common URB #n). Each LLR service (LLR Service #1, . . . , LLR Service #n) may be transmitted for each Su bearer.

That is, one or more common URBs that may be mapped to a CUTCH may be configured depending on the type of a common LLR service and QoS features. If one or more common URBs are configured, priority may be configured between the corresponding URBs.

FIG. 28 is a diagram showing an example of the mapping relation of new logical channels proposed by this specification.

That is, FIG. 28 shows a mapping relation between channels related to urgent data transmission, that is, a mapping relation between a physical channel-transport channel-logical channel.

That is, it may be seen that a PUUCH corresponding to a physical channel is mapped to the UL-UCH channel of a transport channel and the UL-UCH is mapped to the CUTCH of a logical channel.

The PUUCH, the UL-UCH and the CUTCH are not multiplexed with different channels, but channel mapping and a (fast) HARQ procedure are independently performed.

Referring to FIGS. 27 and 28, a new network configuration related to urgent data transmission proposed by this specification includes the following elements (1) to (4).

(1) Common LLR service: Common (or public) LLR services (2) Common URB configuration in the RRC layer: Common/public urgent ratio bearer (URB) configuration in the RRC layer (common urgent transport channel (CUTCH))

(3) LCID allocation for a CUTCH in the MAC layer: logical channel ID (LCID) allocation for a CUTCH in the MAC layer (uplink-urgent channel (UL-UCH))

(4) Urgent data transmission through a configured common URB: Urgent data transmission on a configured common URB Hereinafter, each of the (1) to (4) is described in more detail.

Common Low Latency Radio (LLR) Service: Common (or Public) LLR Services

In this specification, a new LLR service not supported in a conventional communication technology is defined.

The LLR service defined in this specification is a service for transmitting urgent data generated from an urgent service to which a UE has joined, and the LLR service may have the following features.

Service for generating safety-related information, such as disaster safety and traffic safety (service that requires low latency & high reliability)

Urgent data may be generated from a UE (e.g., a vehicle or a mobile phone) which has joined an urgent service. That is, urgent data is transmitted through security information previously configured from an authenticated UE.

A response for urgent data must be broadcasted or multicasted to surrounding UEs of a UE that has generated the urgent data. That is, an eNB or a specific UE (or UEs) transmits urgent data-related control information or notifies surrounding UEs of urgent information.

As described above, urgent data enables a fast response message to be transmitted from a server that has received the urgent data to a surrounding UE of a UE that has underwent an urgent situation or enables the server to directly control a surrounding UE rapidly.

This does not require a dedicated bearer configuration with a UE that has generated an urgent message and with a specific server/UE. The urgent message may transmit data through common bearer information within a cell or PLMN or spec.

That is, a common or public LLR service proposed by this specification, as described above, means an urgent service through which a response message for data generated from a specific UE must be broadcasted or multicasted to a surrounding UE.

Common URB Configuration

Next, a common URB configuration is described.

FIG. 29 is a conceptual diagram showing an example of an urgent radio bearer proposed by this specification.

As shown in FIG. 29, a conventional radio bearer structure defines a signaling radio bearer (SRB) for control information that may be transmitted to a UE and an eNB/MME and a data radio bearer (DRB) for transmitting application data from a UE to an IP network over an eNB/S-GW/P-GW.

Furthermore, the conventional radio bearer structure additionally defines an MBMS radio bearer (MRB) for MBMS data transmitted by a UE through an eNB/MBMS-GW/BM-SC.

As shown in FIG. 29, this specification proposes that an urgent radio bearer (URB) that may be connected to a new urgent-related network entity, such as a specific urgent service provider/server/controller, other than a DRB that is the transmission passage of common data is additionally (or newly) defined in order to transmit urgent data.

The DRB defines a bearer that belongs to an EPC bearer to a UE and P-GW (PDN-GW) and that is a bearer in the radio section between a UE and an eNB. The DRB of the UE is mapped to a specific EPC bearer in a one-to-one manner.

This is for dedicatedly configuring the movement passage of a specific IP flow between a UE and a specific node.

Furthermore, an MRB is a bearer (or service movement passage) for downlink only data transmission. A UE that wants to receive only downlink data service receives a desired broadcasting service through a specific MRB configuration.

In contrast, an URB proposed by this specification is a service movement passage for the uplink only data transmission of a UE, and is a passage for enabling urgent data generated by a UE to be transmitted to an urgent server.

The URB may also be expressed as an urgent bearer (UB). The URB may also be defined as a service movement passage between a UE and an eNB for transmitting urgent data.

In order to support the URB, a new network entity is defined.

In this case, the new network entity may be defined as a new function within a conventional network entity or may mean that a new network entity connected to a new interface is generated.

In FIG. 29, an urgent (service) EPC bearer means a passage configured so that the data of an urgent service can be rapidly transmitted to a specific server outside an EPC network.

In this case, the reason why the server is located outside the network is for providing service to the UEs of all operators who have joined a corresponding service.

For example, if UEs B and C are located near a UE A that has joined an urgent service through an operator A and the UEs B and C are UEs that have joined the corresponding urgent service through respective operators B and C, an urgent message generated from the UE A can have an influence on the UEs B and C.

This means that in order to support this, an operator that provides the corresponding service must be located outside an EPC network and the corresponding service can be provided to the UEs of all of operators at the same time.

A newly defined network entity to which the aforementioned methods proposed by this specification may be applied may include (1) an urgent service controller (USC), (2) an urgent-gateway (U-GW), (3) an urgent service provider, and (4) an urgent service server.

Hereinafter, each of the network entities is described in more detail.

(1) Urgent service controller (USC): an urgent service controller that may be present within an EPC network, and it refers to a network entity for controlling an urgent service that may be managed by specific network providers.

(2) Urgent-Gateway (U-GW): a gateway that enables direct connection with an urgent service server that may be present outside an EPC network, and it means a gateway used as a direct connection passage to an outside server and managed by a company approved by a country or nation, such as a public disaster server or a transportation management server. This may play the same role as a conventional P-GW and may be substituted with a conventional P-GW, but means that it may be newly defined for a faster and direct bearer configuration.

(3) Urgent service provider: a service provider for providing an urgent service outside an EPC network and may be a specific organization under the control of a nation or a company that has been approved by a country. For example, the urgent service provider may be 119, 112, a transportation safety bureau or a disaster management bureau.

(4) Urgent service server: an integrated server connected to a server managed by the urgent service provider or the servers of urgent service providers, and it refers to a network entity located outside an EPC network.

The new network entities defined in (1) to (4) are connected to access points, such as an eNB, and generate new urgent bearers.

If an urgent bearer is generated using a conventional network configuration, corresponding entities may be defined as a function logically different from a convention entity other than an entity that is physically different.

An urgent bearer proposed by this specification means a common urgent bearer, and means a common EPC bearer that may be configured within a cell in common other than a dedicated EPC bearer between a specific UE and a specific termination node (server or UE).

This is for rapidly recognizing corresponding urgent data and transferring urgent data to a server or controller that manages an urgent service using an urgent EPC bearer configured between an eNB and a specific urgent server/controller if a UE that has underwent an urgent situation transmits the uplink data.

In this case, the same bearer can be used within a cell or within the same network supplier. In order for a UE to recognize this, information for a corresponding urgent radio bearer may be broadcasted (method 1) within the cell.

For example, a method of configuring an urgent radio bearer using system information may be defined as in Table 5 below.

That is, Table 5 shows an example of a method of broadcasting common urgent radio bearer information of a cell or PLMN through an SIB.

TABLE 5

```
SystemInformationBlockTypexx::= SEQUENCE {
CommonURB-Info ::= SEQUENCE {
    eps-UrgentBearerIdentity    INTEGER(0..15)       OPTIONAL,    -- Cond
CommonURB-Setup
    urb-ServiceList                 urb-ServiceList      OPTIONAL,
    urb-Identity                    URB-Identity,
    pdcp-Config                     PDCP-Config          OPTIONAL,    -- Cond
PDCP
    rlc-Config                      RLC-Config           OPTIONAL,    -- Cond
Setup
    logicalChannelIdentity          logicalChannelIdentity OPTIONAL,  -- Cond
commonURB-Setup
    ...
    }
  }
}
```

Table 5 shows an example of system information including information for a common URB supported by an eNB.

A UE that has received the SIB including the common URB information may obtain the EPS urgent bearer ID of a common URB, the list of service IDs supportable through the corresponding URB, PDCP configuration information, RLC configuration information, and logical channel ID information.

In this case, one or more services supportable through the common URB may be mapped. It is assumed that the information about the service list has been previously agreed between the UE and the eNB.

If the UE generates a common urgent message according to an urgent situation using the information, it can transmit urgent data through the common URB.

Table 6 below shows an example of a PDCP, RLC and MAC configuration for the common URB.

TABLE 6

| Name | Value | Semantics description | Ver |
|---|---|---|---|
| PDCP configuration | N/A | | |
| RLC configuration | TM | | |
| MAC configuration | | Normal MAC headers are used | |
| logicalChannelIdentity | INTEGER | One LCID is allocated | |

In Table 6, the RLC configuration may also be defined as an acknowledged mode (AM) or an unacknowledged mode (UM) in addition to a transparent mode (TM).

In this case, it may be preferred that a corresponding common radio bearer is used as the TM mode in order to support data transmission having high reliability as unidirectional data without ACK/NACK transmission and the transmission of the entire urgent message at once without RLC SDU segmentation.

Furthermore, information for the corresponding common URB may include a common URB mapped to one or more EPS bearers within a cell. This means that a common URB mapped to an urgent EPS bearer mapped to a different service server can be configured.

In this case, this means that the eNB can transmit the one or more defined CommonURB-Info.

In this case, the LCID (n in number) of a CUTCH may be set depending on a common URB number (n) allocated within a cell.

In this case, the allocation range of the LCID for the configured CUTCH may be defined using a method defined in a "Logical channel ID (LCID) allocation for CUTCH" part to be described later.

Logical Channel ID (LCID) Allocation for CUTCH

Next, an LCID allocation method for a CUTCH is described in detail with reference to a related drawing.

Logical channels belonging to conventional RLC logical channels and defined for the uplink data transmission of a UE include a CCCH, a DCCH and a DTCH.

In this case, the CCCH and the DCCH are channels transmitting control information, and a channel used for a UE to transmit application data is defined as the DTCH.

In this specification, data transmitted by a UE is divided into common data and urgent data. To this end, a common urgent transport channel (CUTCH), that is, a new logical channel, in addition to the DTCH is newly defined.

Urgent data is not multiplexed with common data transmitted through a DTCH. The CUTCH is mapped (FIG. 30) to a shared channel (UL-SCH) in the MAC layer or mapped (FIG. 31) to an urgent channel (UL-UCH), that is, a new MAC layer logical channel.

That is, the mapping relation of a logical channel for urgent data proposed by this specification may be defined as in FIGS. 30 and 31.

FIGS. 30 and 31 are diagrams showing examples of the mapping relation of logical channels for urgent data transmission proposed by this specification.

As shown in FIGS. 30 and 31, a CUTCH newly defined in this specification means a logical channel used for urgent data transmission generated from the common LLR service of a UE and is a channel with which multiplexing with uplink data transmitted through a CCCH/DCCH/DTCH is not performed.

Furthermore, for an urgent service, a new function, such as a fast HARQ, may be applied.

It may be defined so that the CUTCH is mapped to a new MAC layer logical channel called an "UL-UCH" as in FIG. 31 or so that the CUTCH is mapped to a "conventional UL-SCH" as in FIG. 30.

If a CUTCH is mapped to a new UL-UCH as in FIG. 31, the CUTCH may be mapped to a PUUCH that is a new physical channel.

In this case, the PUUCH is a physical uplink urgent channel and means a new uplink physical channel defined for urgent data transmission.

In this case, a new logical channel ID (LCID) may be mapped to a logical channel for urgent data transmitted as a common URB that has been configured in order to identify urgent data in the MAC layer.

As described above, the LCID may be allocated from an eNB when a common URB is configured, and this may be defined an UL-SCH or an LCID for an UL-UCH.

LCID Allocation for CUTCH

Hereinafter, a method of defining an LCID for a CUTCH in an UL-SCH or UL-UCH is described in detail.

First, a method of defining an LCID for a CUTCH in an UL-SCH is described.

In this method, one LCID or one or more LCIDs of a conventional UL-SCH are allocated and sued for common urgent data transmission.

That is, a UE receives an LCID for a specific service allocated through system information and thus can obtain the LCID of an urgent URB for a service that the UE has joined.

Table 7 below shows an example of CUTCH-related LCID values and shows an example if one CUTCH is allocated to an LCID value.

TABLE 7

| Index | LCID values |
|---|---|
| 00000 | CCCH |
| 00001-01010 | Identity of logical channel |
| 01011 | CUTCH |
| 01100-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Table 8 shows another example of CUTCH-related LCID values and shows an example if one or more CUTCHs are allocated to an LCID value.

TABLE 8

| Index | LCID values |
|---|---|
| 00000 | CCCH |
| 00001-01010 | Identity of logical channel |
| 01011-01111 | CUTCH |
| 10000-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Next, a method of defining one LCID for a CUTCH in an UL-UCH is described.

In this method, an LCID for an UL-UCH is newly defined.

That is, this method may be used if an UL-UCH is mapped as a specific physical resource.

In this specification, it is defined that an UL-UCH is mapped to a physical uplink urgent channel (PUUCH) newly defined for fast data transmission.

In this case, the PUUCH is a new defined physical channel and may be defined as an uplink physical resource allocated for urgent data, such as the aforementioned contention resource and urgent preemption resource.

That is, the PUCCH is an uplink physical resource different from a conventional PUSCH and means a physical channel for urgent data transmission.

In this case, a UE and an eNB can identify MAC layer data using an LCID for an UL-UCH, and LCID values defined for this are shown in Table 9 and Table 10 below.

Table 9 and Table 10 are samples of LCID values newly defined for the UL-UCH proposed by this specification. Table 9 is an example if one CUTCH is allocated, and Table 10 is an example if one or more CUTCHs are allocated.

TABLE 9

| Index | LCID values |
|---|---|
| 00000 | CCCH |
| 00001-00010 | DCCH |

TABLE 9-continued

| Index | LCID values |
|---|---|
| 00011-01010 | Reserved |
| 01011 | CUTCH |
| 00100-11000 | Reserved |
| 11111 | Padding |

TABLE 10

| Index | LCID values |
|---|---|
| 00000 | CCCH |
| 00001-00010 | DCCH |
| 00011-01010 | Reserved |
| 01011-01111 | CUTCH |
| 10000-11000 | Reserved |
| 11111 | Padding |

Urgent Data Transmission Method Through Configured Common URB

Next, a method of transmitting urgent data using the aforementioned common URB is described with reference to a related drawing.

A UE (urgent UE) capable of using an urgent service may transmit urgent data using common URB information configured in a cell when an urgent situation occurs.

If the urgent UE is a UE whose connection with a cell has been configured (RRC_connected state), it may preempt uplink resources using dedicated resources, such as a scheduling request (SR) or an urgent signal (US), and may transmit urgent data through the preempted resources.

Alternatively, if the urgent UE is a UE whose connection with a cell has not been configured (RRC_idle state), the urgent UE may preempt uplink resources through an RACH preamble transport and transmit urgent data through the preempted resources.

That is, an urgent message mapped to the aforementioned CUTCH and transmitted may mean that it has higher priority than other data that may be transmitted through the existing CCCH/DCCH/DTCH.

That is, this means that when (urgent) data corresponding to the CUTCH reaches a buffer, the UE may preferentially transmit the urgent data through corresponding resources if it has resources that belong to uplink resources capable of being used by the UE and that can transmit the urgent data.

In this case, a buffer status report (BSR) may not be necessary. The UE may transmit the urgent data using a contention resource or an urgent preemption resource.

Alternatively, the UE may transmit urgent data in a PUSCH through an UL grant.

Furthermore, if the UE has uplink resources allocated for the transmission of data mapped to another CCCH/DCCH/DTCH and it is determined that the allocated uplink resources are sufficient to transmit an urgent message, the UE may preferentially transmit data for a CUTCH using the allocated uplink resources.

In this case, the UE also transmits an LCID for the CUTCH, providing notification that the data of an MAC SDU is urgent data, in an MAC header along with the transmitted data.

Thereafter, an eNB that has received the data and the LCID for the CUTCH related to the data from the UE may immediately transfer the corresponding data to a specific server through a common URB mapped to the LCID.

As described above, since the common urgent bearer is a bearer that may be used in common within a cell, a UE capable of transmitting data using uplink resources can rapidly transmit an urgent message regardless of state information.

FIG. 32 is a flowchart illustrating an example of a method of transmitting, by a UE in the idle state, urgent data using a common URB which is proposed by this specification.

FIG. 32 is a flowchart illustrating an example of a method of transmitting, by a UE in the idle state, urgent data using a common URB which is proposed by this specification.

Referring to FIG. 32, an EPC common urgent bearer has been configured between an eNB and a U-GW (S3210).

Next, a UE receives common urgent bearer (Common URB)-related information configured at step S3210 from the eNB through system information (S3220).

In this case, it is assumed that the UE is an idle state.

The system information is an SIB-x, and x may be 2 to 19.

Thereafter, the UE in the idle state transmits an RACH preamble to the eNB in order to receive an allocated UL grant related to urgent data transmission (S3230).

Thereafter, the UE receives the UL grant allocated by the eNB (S3240), and transmits urgent data to the eNB using the allocated resources (S3250).

Alternatively, the UE may also transmit the urgent data through a contention resource along with the RACH preamble transport at step S3230.

The aforementioned method of preempting uplink resources for the urgent data transmission of an idle UE in FIG. 3 is an embodiment, and the definitions and methods proposed by this specification are not limited thereto.

Furthermore, as described above, if the UE transmits urgent data to the eNB through preempted uplink resources using various methods, the UE transmits the urgent data using an LCID (e.g., 01011) mapped to a common URB.

The LCID value is included in an MAC header. This indicates that the data of an MAC SDU is urgent data.

FIG. 33 is a flowchart illustrating an example of a method of transmitting, by a UE in the connection mode state, urgent data using a common URB which is proposed by this specification.

FIG. 33 shows a case where urgent data is transmitted through an UL-UCH.

In FIG. 33, it is assumed that a UE is the connected state.

As in the idle stat UE of FIG. 33, the connected state UE may also preempt uplink resources using various methods.

In this case, if the UE transmits urgent data using the preempted uplink resources, the UE transmits the urgent data using an LCID mapped to a common URB.

Referring to FIG. 33, an EPC common urgent bearer has been configured between an eNB and a U-GW/server (S3310).

Thereafter, the UE receives configured common URB information and PUUCH-related information through system information from the eNB (S3320).

The system information may be expressed as an SIB-x, and the x may be the value of any one of 2 to 19.

Thereafter, the UE performs an RRC connection establishment procedure with the eNB based on the received system information (S3330).

Thereafter, the UE receives an RRC connection reconfiguration message including SR allocation (or configuration) information from the eNB (S3340).

Thereafter, the UE transmits urgent data to the eNB through a PUUCH along with the SR (S3350).

Thereafter, the eNB transmits the urgent data, received from the UE, to the U-GW/server using the common URB (S3360).

The urgent data described in this specification must use a message format defined along with a server that provides service, and it is assumed that the corresponding message has been encrypted and transmitted along with the server. Furthermore, it is assumed that the transmitter of a corresponding message may also be identified by the format defined in an application level.

General Apparatus to which the Present Invention May be Applied

FIG. 34 illustrates a block diagram of a wireless communication apparatus to which the methods proposed by this specification may be applied.

Referring to FIG. 34, the wireless communication system includes an eNB 3410 and a plurality of UEs 3420 located within the eNB 3410 region.

The eNB 3410 includes a processor 3411, memory 3412 and a radio frequency (RF) unit 3413. The processor 3411 implements the functions, processes and/or methods proposed in FIGS. 1 to 33. The layers of a radio interface protocol may be implemented by the processor 3411. The memory 3412 is connected to the processor 3411 and stores various types of information for driving the processor 3411. The RF unit 3413 is connected to the processor 3411 and transmits and/or receives a radio signal.

The UE 3420 includes a processor 3421, memory 3422 and an RF unit 3423. The processor 3421 implements the functions, processes and/or methods proposed in FIGS. 1 to 33. The layers of a radio interface protocol may be implemented by the processor 3421. The memory 3422 is connected to the processor 3421 and stores various types of information for driving the processor 3421. The RF unit 3423 is connected to the processor 3421 and transmits and/or receives a radio signal.

The memory 3412, 3422 may be located inside or outside the processor 3411, 3421) and may be connected to the processor 3411, 3421 through well-known various means.

Furthermore, the eNB 3410 and/or the UE 3420 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for uplink data transmission in a wireless communication system according to the present invention has been described based on an example in which the method is applied to the 3GPP LTE/LTE-A systems, but may be applied to various wireless communication systems in addition to the 3GPP LTE/LTE-A systems.

What is claimed is:

1. A method for transmitting, by a wireless device, data in a wireless communication system, the method comprising:
receiving, from a base station, control information related to a transmission of the data; and
transmitting, to the base station, the data based on the control information,
wherein the control information is based on an uplink (UL) grant,
wherein, based on that the transmission of the data is related to a low latency service:
the data is transmitted through a pre-configured channel;
the pre-configured channel is based on a logical channel which is configured for a transmission of data related to the low latency service; and
the data which is transmitted through the pre-configured channel is not multiplexed, in a same transport block, with other data not related to the low latency service which is transmitted by the wireless device.

2. The method of claim 1, wherein the control information comprises at least one of low latency related bearer information or low latency related channel information.

3. The method of claim 1, wherein the data related to the low latency service is processed with a first hybrid automatic retransmit request (HARQ) procedure, and the other data is processed with a second HARQ procedure.

4. The method of claim 1, wherein the data related to the low latency service comprises a medium access control (MAC) header, and the MAC header comprises a logical channel ID (LCID) indicative of a type of data transmitted.

5. The method of claim 1, wherein the pre-configured channel is related to resources for transmitting the data related to the low latency service.

6. The method of claim 1, wherein the control information is included in system information.

7. A wireless device in a wireless communication system, the wireless device comprising:
a radio frequency (RF) transceiver;
a processor; and a memory operably connectable to the at least one processor and storing instructions that, when executed, cause the at least one processor to perform operations comprising:

receiving, from a base station, control information related to a transmission of the data; and transmitting, to the base station, the data based on the control information, wherein the control information is based on an uplink (UL) grant, wherein, based on that the transmission of the data is related to a low latency service:

the data is transmitted through a pre-configured channel;

the pre-configured channel is based on a logical channel which is configured for a transmission of data related to the low latency service; and the data which is transmitted through the pre-configured channel is not multiplexed, in a same transport block, with other data not related to the low latency service which is transmitted by the wireless device.

8. The wireless device of claim 7, wherein the control information comprises at least one of low latency related bearer information or low latency related channel information.

9. The wireless device of claim 7, wherein the data related to the low latency service is processed with a first hybrid automatic retransmit request (HARQ) procedure, and the other data is processed with a second HARQ procedure.

10. The wireless device of claim 7, wherein the data related to the low latency service comprises a medium access control (MAC) header, and the MAC header comprises a logical channel ID (LCID) indicative of a type of data transmitted.

11. The wireless device of claim 7, wherein the pre-configured channel is related to resources for transmitting the data related to the low latency service.

12. The wireless device of claim 7, wherein the control information is included in system information.

* * * * *